US012520087B2

(12) United States Patent
Josupeit et al.

(10) Patent No.: US 12,520,087 B2
(45) Date of Patent: Jan. 6, 2026

(54) HEARING AID COMPRISING AN ADAPTIVE NOTIFICATION UNIT

(71) Applicant: Oticon A/S, Smoerum (DK)

(72) Inventors: Angela Josupeit, Smoerum (DK); Peter Mølgaard Sørensen, Ringkoebing (DK); Sara Klimt-Møllenbach, Smoerum (DK); Caroline Ekelund, Smoerum (DK); Xi Li, Smoerum (DK); Mehran Sadri, Smoerum (DK); Peter Rønberg, Smoerum (DK); Gusztáv Löcsei, Smoerum (DK); Stine Bech Petersen, Smoerum (DK)

(73) Assignee: Oticon A/S, Smørum (DK)

( * ) Notice: Subject to any disclaimer, the term of this patent is extended or adjusted under 35 U.S.C. 154(b) by 270 days.

(21) Appl. No.: 18/192,686

(22) Filed: Mar. 30, 2023

(65) Prior Publication Data

US 2023/0328461 A1 Oct. 12, 2023

(51) Int. Cl.
*H04R 25/00* (2006.01)

(52) U.S. Cl.
CPC ......... *H04R 25/30* (2013.01); *H04R 2225/41* (2013.01); *H04R 2225/43* (2013.01); *H04R 2225/55* (2013.01)

(58) Field of Classification Search
CPC ................ H04R 25/30; H04R 2225/41; H04R 2225/43; H04R 2225/55; H04R 25/43; H04R 1/1041; H04R 25/505; H04R 25/305; H04R 25/00; H04R 2420/01
See application file for complete search history.

(56) References Cited

U.S. PATENT DOCUMENTS

| | | | |
|---|---|---|---|
| 6,330,339 | B1 | 12/2001 | Ishige et al. |
| 2012/0213393 | A1 | 8/2012 | Foo et al. |
| 2014/0044269 | A1 | 2/2014 | Anderson |
| 2016/0080876 | A1 | 3/2016 | Lunner |
| 2016/0381450 | A1 | 12/2016 | Taite et al. |

FOREIGN PATENT DOCUMENTS

| | | |
|---|---|---|
| EP | 2259605 | 12/2010 |
| EP | 3930346 | 12/2021 |
| WO | WO-2007/007916 | 1/2007 |
| WO | WO2008/083315 | 7/2008 |

*Primary Examiner* — Tuan D Nguyen

(57) ABSTRACT

A hearing aid configured to be worn by a user comprises an input processing unit comprising at least one input transducer for providing at least one input audio signal representative of sound, the input processing unit providing at least one processed input audio signal in dependence of said at least one input audio signal; a sound scene analyzer for analyzing said sound in said at least one input audio signal and providing a sound scene control signal indicative of a current sound environment; a notification unit configured to provide a notification signal in response to a notification request signal indicative of a request for conveying a specific message to the user; an output processing unit for presenting stimuli perceivable as sound to the user in dependence of said at least one processed input audio signal and said notification signal. The notification signal is determined in response to said notification request signal and the sound scene control signal.

24 Claims, 10 Drawing Sheets

HEARING AID COMPRISING AN ADAPTIVE NOTIFICATION UNIT

TECHNICAL FIELD

The present disclosure relates to hearing devices, such as hearing aids (or headsets/earphones). The disclosure relates e.g. to the handling of notifications (e.g. spoken notifications) of the user in different (e.g. acoustic) situations.

Spoken notifications (or other notifications) are generally short, spoken messages (or otherwise 'coded' messages, e.g. beeps or tonal combinations, etc.) played back to the user through their hearing instrument, e.g. as a notification about an internal state of the instrument, e.g., in the form of a low-battery warning, or as a confirmation of an action performed by the user to change a setting of the hearing instrument, e.g., a program change, etc., e.g. via a user interface of the hearing instrument.

SUMMARY

A First Hearing Aid:

In a 1st aspect of the present application, a hearing aid configured to be worn by a user, is provided by the present disclosure. The hearing aid comprises

- An input processing unit comprising at least one input transducer for providing at least one input audio signal representative of sound, the input processing unit providing at least one processed input audio signal in dependence of said at least one input audio signal;
- A sound scene analyzer for analyzing said sound in said at least one input audio signal, or in a signal originating therefrom, and providing a sound scene control signal indicative of a current sound environment;
- A notification unit configured to provide a notification signal in response to a notification request signal indicative of a request for conveying a (specific) message to the user;
- An output processing unit for presenting stimuli perceivable as sound to the user, where said stimuli are determined in dependence of said at least one processed input audio signal and said notification signal.

The hearing aid may be configured to provide that the notification signal is determined in response to said notification request signal and to said sound scene control signal.

Thereby an improved hearing aid may be provided.

A corresponding first method of operating a hearing aid may be provided by converting the structural features of the first hearing aid to corresponding (equivalent) process features.

A Second Hearing Aid:

In a 2nd aspect, a hearing aid configured to be worn by a user is provided by the present disclosure. The hearing aid comprises

- An input unit comprising at least one input transducer for providing at least one input audio signal representative of sound in the environment of the hearing aid and/or representative of streamed sound;
- At least one level estimator configured to provide an estimated input level of said at least one input audio signal;
- A notification unit configured to provide a notification signal comprising a notification to the user in response to a notification request signal;
- A hearing aid processor configured to apply one or more processing algorithms, including a compressive amplification algorithm configured to apply a level and frequency dependent gain to said at least one input audio signal, or to a signal dependent thereon, to thereby compensate for the user's hearing impairment and to provide a processed signal comprising said notification signal;
- An output unit configured to provide stimuli perceivable to the user as sound in dependence of said processed signal.

The notification unit or the hearing aid processor may be configured to adjust a level of the notification signal in dependence of the estimated input level.

Thereby an improved hearing aid may be provided.

A corresponding second method of operating a hearing aid where the structural features of the hearing aid according to the 2nd aspect are substituted by equivalent process features is furthermore provided by the present application.

A Third Hearing Aid:

In a 3rd aspect of the present application, a hearing aid configured to be worn by a user, is provided by the present disclosure. The hearing aid comprises

- An input processing unit comprising at least one input transducer for providing at least one input audio signal representative of sound, the input processing unit providing at least one processed input audio signal in dependence of said at least one input audio signal;
- A situation analyzer for analyzing an environment around the user and/or a physical or mental state of the user, and providing a situation control signal indicative thereof;
- A notification unit configured to provide a notification signal in response to a notification request signal indicative of a request for conveying a (specific) message to the user;
- An output processing unit for presenting stimuli perceivable as sound to the user, where said stimuli are determined in dependence of said at least one processed input audio signal and said notification signal.

The hearing aid may be configured to provide that the notification signal is determined in response to said notification request signal and to said situation control signal.

Thereby an improved hearing aid may be provided.

The hearing aid may e.g. comprise (or have access to control signals from) a number of sensors. The number of sensors may e.g. be configured to classify a current physical and/or mental state of the user. The number of sensors may e.g. include a movement sensor (e.g. an accelerometer) or a bio-sensor (e.g. an EEG-sensor, or a PPG sensor, etc.). Other sensors may be used to characterize the current physical or mental state of the user.

The situation analyzer may e.g. be configured to include the use of a movement sensor (e.g. an accelerometer) to detect a current physical state of the user (e.g. moving (e.g. walking or running) or not moving (e.g. resting or sitting (relatively) still).

The situation analyzer may e.g. be configured to include the use of a bio-sensor (e.g. an EEG-sensor) to detect a current mental state of the user (e.g. a current cognitive load, cf. e.g. U.S. Pat. No. 6,330,339B1, or US2016080876A1.

The hearing aid may be configured to prioritize specific situations differently, e.g. a 'lost hearing aid notification' may have a higher priority or lower priority depending on the situation, (e.g. higher when moving, e.g. jogging, than when sitting still or resting).

The hearing aid may be configured to automatically provide the notification request signal in dependence of an internal state of the hearing aid, e.g., a low-battery voltage. The hearing aid may alternatively or additionally be configured to provide the notification request signal in dependence of a user input, e.g. as a confirmation of an action performed by the user, e.g., a program change, etc. In other words, the notification request may have its origin in a change of status of functionality of the hearing aid and/or be initiated by a change of functionality of the hearing aid incurred by the user, e.g. via a user interface.

The situation analyzer may e.g. be constituted by or comprise the sound scene analyzer as described in the present disclosure.

A corresponding thirds method of operating a hearing aid where the structural features of the hearing aid according to the 3$^{rd}$ aspect are substituted by equivalent process features is furthermore provided by the present application.

Features of the First or Second or Third Hearing Aid.

The hearing aid may be configured to provide that the notification request signal provides a status of functionality of the hearing aid or that it provides a confirmation of an action performed by the user to change functionality of the hearing aid.

The hearing aid may be configured to provide that the message intended to be conveyed to the user (and thus the notification signal) relates to an internal state of the hearing aid, e.g., a low-battery voltage or capacity, or is a confirmation of an action performed by the user to change functionality of the hearing aid, e.g. a program change, e.g. via a user interface.

The hearing aid (e.g. the output processing unit, e.g. a hearing aid processor) may be configured to provide a predefined mixing ratio of the notification signal (or a processed notification signal) relative to the at least one input signal (or a processed version of the at least one input audio signal).

The notification signal is intended to represent the (specific) message to the user. The notification signal may e.g. be or comprise an information related to the hearing aid, e.g. a) about an internal state of the hearing aid, e.g., a low battery voltage (presented as a 'low battery' warning), orb) as a confirmation of an action performed by the user in relation to the functionality of the hearing aid, e.g., a program change, etc.

The at least one input transducer may comprise a microphone for converting sound in the environment of the hearing aid to an input audio signal representing the sound. The at least one input transducer may alternatively or additionally comprise a transceiver (or receiver) for receiving a wired or wireless signal comprising audio and for converting the received signal to an input audio signal representing said (streamed) audio.

The hearing aid may comprise a general scene or environment analyzer (e.g. including a sound scene analyzer as described below). The environment analyzer may comprise a classification of at least one of A) the current physical environment, B) the current sound environment, C) a current activity, or a current state, of the user, etc.

The hearing aid may comprise an acoustic sound scene analyzer (e.g. a classifier) configured to classify the context of the current at least one input audio signal in a number (e.g. a plurality) of sound scene classes and to provide a sound scene control (e.g. classification) signal indicative of an acoustic environment (e.g. a sound scene class) represented by the current at least one input audio signal.

The sound scene analyzer may be configured to classify sound in the at least one input audio signal, or in a signal originating therefrom. In the present context, 'a signal originating therefrom' may be or comprise the at least one processed input audio signal.

The at least one input audio signal may be representative of sound in the current acoustic environment of the hearing aid (picked up by one or more microphones, e.g. of the hearing aid) or it may be representative of streamed audio received by a wired or wireless receiver.

The sound scene analyzer may receive the (typically digitized, possibly band-split) input audio signal from a microphone or a wired or wireless audio receiver, e.g. in case only one input transducer (e.g. a microphone or an audio receiver) is active at a given time. The sound scene analyzer may receive a processed signal, e.g. a beamformed signal, or a mixed signal (e.g. a mixture of a microphone signal (or a beamformed signal) and an audio signal received via an audio receiver), e.g. in case more than one input transducer is active at a given time, or in case of a (e.g. further) microphone signal originating from a microphone placed in the ear canal.

The hearing aid (e.g. the output processing unit) may comprise a hearing aid processor. The hearing aid processor may comprise a compressor for applying a level and frequency dependent gain to the input audio signal to the hearing aid processor (or a to signal originating therefrom), e.g. to the processed audio input signal provided by the input processing unit. The hearing aid processor may comprise the sound scene analyzer (and/or a situation analyzer).

The sound scene analyzer may be configured to determine one or more parameters characterizing said current sound environment from said at least one input audio signal, or from a signal originating therefrom. The sound scene analyzer may be configured to provide the one or more parameters characterizing the current sound environment as discrete labels (labeling the input signal as e.g., speech dominated or not speech-dominated, e.g. classes provided by a sound scene classifier) or continuous parameter(s) (e.g., signal level), or a combination of both.

The hearing aid may comprise a sound scene classifier configured to classify the current sound environment represented by the at least one input audio signal, or in a signal originating therefrom, in a number of sound scene classes and to provide a sound scene classification signal indicative of a sound scene class of the current sound environment. The sound scene classifier may be configured to classify the current sound environment into one of a plurality of sound scene classes.

The sound scene analyzer may comprise the sound scene classifier. The sound scene control signal provided by the sound scene analyzer may be indicative of the sound scene class provided by the sound scene classifier. The sound scene control signal may be equal to or comprise the sound scene classification signal.

The sound scene classifier may be configured to provide at least two sound scene classes, e.g. 'speech-dominated' or 'non-speech-dominated'. The sound scene classifier may e.g. be configured to provide three or more, such as five or more classes. Other classifiable sound environments may comprise 'speech-dominated', 'own voice dominated', 'conversations', 'music dominated' (e.g. a concert), etc.

The sound scene analyzer may be configured to classify said sound in said at least one input audio signal, or in a signal originating therefrom, according to a level of said signal. The sound scene analyzer (e.g. the sound scene classifier) may be configured to provide a plurality (e.g. two or more, such as three or more, such as five or more) of sound scene classes, each class being indicative of a different level or level range of the at least one input audio signal, or in a signal originating therefrom.

The notification signal may be constituted by or comprise a spoken information.

The information may comprise a (specific) message to the user. The notification signal may be constituted by or comprise a non-spoken notification, e.g. a tonal notification, e.g. comprising 'beeps' or a combination of frequencies. The notification signal may be or comprise a (e.g. sequential) mixture of a non-spoken notification, e.g. a tonal notification, and a spoken notification.

The hearing aid may comprise a notification mode of operation, wherein said notification unit provides a specific notification signal having a specific duration, and wherein the processed input audio signal to the output processing unit comprises said at least one input audio signal, or a signal or signals originating therefrom, and said specific notification signal. The notification mode of operation may be activated (and deactivated) by the notification request signal. The processed input audio signal to the output processing unit may comprise a sum of the at least one input audio signal, or a signal or signals originating therefrom, and the specific notification signal. The hearing aid may comprise a normal mode of operation wherein the processed input audio signal to the processing unit comprises the at least one input audio signal, or a signal or signals originating therefrom (e.g. without any notification signal).

The hearing aid (e.g. the notification unit) may be configured to select a type of notification signal in dependence of the sound scene control signal (or the situation control signal). The type of notification signal may comprise a spoken notification, or a non-spoken notification, e.g. a beep or jingle, or mixture of the two. A combination of a spoken notification and a non-spoken notification may e.g. be a sequential mixture (e.g. a non-spoken notification followed by a spoken notification). The non-spoken notification may e.g. be configured to attract the user's attention to the subsequent spoken notification.

The hearing aid may be configured to control the type of notification (beep or spoken or both) (e.g. in dependence of the sound scene control signal, or the situation control signal) and the timing of the presentation of the notification, e.g. how important is it (priority)? (does it need to be sent now, or can it wait?). It may e.g. (in certain situations) be of interest to wait with the presentation of a notification, e.g. if a user is in a conversation (e.g. defined in that the current voices include own voice elements). Hence, the hearing aid may be configured to provide an estimate of the priority of the requested notification, e.g. provided by a notification priority parameter or signal.

The timing of the presentation of the notification signal may be determined based on the notification request signal.

The appropriate type (e.g. a beep, or spoken notification, or a combination thereof) and presentation (e.g. the level relative to an input audio signal from a microphone, or the timing of the notification (e.g. 'now' or delayed)) of a notification to the user may be dependent on a number of factors, e.g. one of or more of a) an estimate of the importance (priority) of the requested notification and/or b) the current sound environment (noisy, silent, speech dominated, noise dominated, music, etc.), and/or c) the current physical environment (e.g. temperature, light, time of day, etc.) and/or d) an activity or state or location of the user (e.g. physical activity, movement, temperature, mental load, hearing loss, etc.).

The notification signal may be determined in response to the notification request signal and the sound scene control signal (or the situation control signal). The notification request signal may be configured to control the specific 'message' (and possibly its duration and/or delay) intended to be conveyed to the user by the notification signal (the 'message' e.g. being that the battery is running out of power, or that a program has been changed). The sound scene control signal (or the situation control signal) may be configured to control the specific type of the notification signal (spoken (e.g. 'battery low'), non-spoken (e.g. beeps, or sound images illustrating a message, etc.), or a combination thereof).

The hearing aid may be configured to gauge the user's engagement in the surroundings. It may be assumed that when the input sound signal from a microphone is speech-dominated, the user needs to engage more in the environment than if the input sound signal is non-speech-dominated. If the user is engaged in a dialogue, he or she is not as prepared to listen/receive a message (notification). This could be gauged in other ways, e.g. by conversation tracking.

The sound scene analyzer may e.g. be configured to identify a conversation that the hearing aid user is currently engaged in (e.g. using identification of 'turn taking' (see e.g. EP3930346A1). In such case a delay of the presentation of the notification or the selection of the type of notification may be relevant (e.g. in dependence of an urgency (priority) of the notification).

The sound scene analyzer or a more general situation analyzer may be configured to gauge (monitor) the readiness of the user to receive a notification. The hearing aid may be configured to select an appropriate presentation (e.g. type, duration, delay) of the notification in dependence of such readiness.

The relative importance of a message based on internal states of the hearing aid may be determined in advance of use of the hearing aid and stored in memory, e.g. as a predetermined table of relative importance of a given notification (message) in different situations (context). The relative importance of a message may be a further way to control the message type (e.g., high-priority (important) messages may be played back louder and/or without delay than low-priority (less important) messages.

The hearing aid may be configured to select a specific type (and/or delay or repetition) of notification in dependence of the (estimated) relative importance (priority) of the message and a current activity or sound scene.

Other environmental or personal parameters or properties may be of importance to the appropriate presentation of a notification to the user.

The notification unit may be configured to provide a notification signal and a notification processing control signal in response to the notification request signal, wherein the notification processing control signal is determined in dependence of said sound scene control signal from the sound scene analyzer (and/or the situation control signal from the situation analyzer).

The notification processing control signal from the notification unit may be forwarded to the output processing unit (e.g. to 'the' or 'a' hearing aid processor). The notification processing control signal may e.g. be configured to control or influence a gain applied to a combined signal comprising the input audio signal (or a processed version thereof) and the notification signal, e.g. in dependence of the type of notification signal (spoken, non-spoken or a combination). In case the notification signal is a combination of a non-spoken signal (e.g. beeps) and a subsequent spoken signal, the notification processing control signal may be configured to adapt the gain to the combined signal comprising the non-spoken part of the notification signal to be larger than the gain applied to the combined signal comprising the spoken part of the notification signal, to focus the user's attention to the (subsequent spoken part of the) notification signal.

The notification processing control signal may e.g. be configured to control processing of the notification signal in the output processing unit, e.g. to control the gain applied to the notification signal (e.g. relative to a level of the processed input audio signal received from the input processing unit).

The notification processing control signal provided by the notification unit to the output processing unit (e.g. to the hearing aid processor) may contain instructions to the output processing unit (e.g. the hearing aid processor) to apply a specific gain (e.g. an attenuation) to the processed input audio signal, when the notification signal is present (cf. e.g. FIG. 4).

The hearing aid may comprise a notification controller configured to provide the notification request signal when a hearing aid parameter related to the status of functionality of the hearing aid fulfils a hearing aid parameter status criterion.

The status of functionality of the hearing aid may comprise a battery status. The hearing aid parameter related to the status may comprise a current battery voltage or an estimated remaining battery capacity. The battery status criterion may comprise that the battery voltage is below a critical voltage threshold value or that the estimated remaining capacity of the battery is below a critical rest capacity threshold value.

The status of functionality of the hearing aid may comprise a hearing aid program status. The hearing aid parameter related to the status may comprise a current hearing aid program value. The hearing aid program status criterion may comprise that a hearing aid program has been changed.

The notification controller may also generate a notification request signal on an explicit request from the end user, e.g., when the user changes the program or the volume (e.g. mutes sound from an input transducer), etc.

The notifications may e.g. be solely (e.g. automatically) triggered based on (a change of) an internal state of the hearing aid (e.g. related to functionality of the hearing aid), or triggered directly by the user (e.g. via a user interface of the hearing aid).

The status of functionality of the hearing aid may comprise one or more of a mute/no mute status criterion comprising that a mute state has been changed. Other status parameters that may be monitored and whose change of status may trigger the issue of a notification to the user may comprise one or more of a flight mode status, the need to change a wax filter, Bluetooth/connectivity/pairing status, power off, the need to see a hearing care professional (HCP), an identification about left/right, and identification of the end of a trial period, etc.

The hearing aid may comprise a user interface configured to allow a user to control functionality of the hearing aid, including to allow the user to configure the notification unit, e.g. to determine the timing of, or threshold values for, or parameter status criterion for, providing a given notification request signal to initiate the delivery of a specific message to the user.

The user interface may e.g. be configured to allow the user to determine a) the timing of, orb) threshold values for, or c) a parameter status criterion for, a given notification request signal (NRS) intended to initiate the delivery of a specific notification signal (NOT) to the user. The user interface may also be configured to allow a user to perform one or more of the following actions A) to change a currently active hearing aid program, B) to mute input transducers, C) to change a mode of operation (e.g. to enter (or leave) C1) a communication mode of operation, C2) an audio reception mode of operation, C3) a low power mode of operation, or C4) a notification mode of operation, etc.).

The at least one input transducer may comprise a microphone for converting sound in the environment of the hearing aid to an input audio signal representing the sound, and/or a wireless audio receiver for receiving an audio signal from another device, the wireless audio receiver being configured to provide a streamed input audio signal. The processed input audio signal may comprise or be constituted by or be a processed version of the input audio signal provided by the microphone. The processed input audio signal may comprise or be constituted by or be a processed version of the (streamed) input audio signal provided by the wireless audio receiver. The processed input audio signal may be a combination (e.g. a sum of or a weighted sum of) the streamed input audio signal and an input audio signal from a microphone or a combination of microphone signals (e.g. a beamformed signal), or processed versions thereof.

The hearing aid may comprise an active noise cancellation (ANC) system configured to cancel acoustic sound in the ear canal leaking to the eardrum from the environment (passing an earpiece of the hearing aid (e.g. through a ventilation channel of the earpiece/hearing aid). The hearing aid (e.g. the notification unit) may e.g. be configured to activate the ANC system in dependence of the notification request signal. The hearing aid (e.g. the notification unit) may e.g. be configured to activate the ANC system in dependence of the sound scene control signal (or the situation control signal). The hearing aid (e.g. the notification unit) may e.g. be configured to activate the ANC system at an estimated threshold level (e.g. direct SPL, e.g. at levels larger than a threshold value) of the at least one input audio signal. The hearing aid (e.g. the notification unit) may e.g. be configured to activate the ANC system in dependence of a combination of one or more the notification request signal, the sound scene control signal (or the situation control signal), and the estimated level of the at least one input audio signal.

The hearing aid, e.g. the notification unit, may comprise a delay indicator configured to delay the presentation of a notification signal based on an input (e.g. the sound scene control signal, or the situation control signal) from the sound scene analyzer. The notification unit may be configured to delay the notification signal to a point in time when the level estimate of the at least one input audio signal is lower than a threshold value. The notification unit may be configured to assure that the notification signal will not be delayed more than a predetermined maximum delay.

The hearing aid (e.g. the notification unit) may be configured to adapt the signal-to-noise ratio (SNR) margin at which audible indicators' are intelligible to user's dependence on the interaction between indicator type (type of notification (e.g. spoken, non-spoken)) and acoustic scene (e.g. identified by the sound scene control signal, or the situation control signal). The hearing aid (e.g. the notification unit) may be configured to adjust the SNR at which the audible indicator (i.e. the notification signal) is presented, depending on the indicator type (type of notification) and the acoustic scene. The hearing aid may be configured to adaptively determine the SNR margin (e.g. using an adaptive filter).

The 'audible indicator' may e.g. be taken to mean the acoustic representation of the notification signal provided by the output processing unit as stimuli perceivable as sound to the user.

The hearing aid may be configured to apply a gain to the at least one input audio signal or a processed version thereof in dependence of the notification request signal and/or the sound scene control signal (or the situation control signal). The gain (e.g. an attenuation) may be applied during the duration of the notification signal, e.g. when the hearing aid is in a notification mode. The hearing aid may e.g. be configured to attenuate the at least one input audio signal or a processed version thereof in dependence of a level of said signal (e.g. to provide that the competing sound signal, $S_{amp}$, is attenuated, when the notification signal is played to the user). Thereby the 'signal-to-noise ratio' ('SNR') is improved during the duration of the notification signal (see e.g. FIG. 4) (where the notification signal is the 'signal' and the competing sound signal received by the hearing aid from the environment and/or a streaming audio source is the 'noise').

The hearing aid may be constituted by or comprising an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up—by the hearing aid to another device, e.g. a far-end communication partner (e.g. via a network, e.g. in a telephone mode of operation, or in a headset configuration).

The hearing aid may comprise an input unit for providing an input audio signal representing sound. The input unit may comprise an input transducer, e.g. a microphone, for converting an input sound to an input audio signal. The input unit may comprise a wireless receiver for receiving a wireless signal comprising or representing sound and for providing an input audio signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct input audio signal from another device. Likewise, the hearing aid may be configured to wirelessly transmit a direct electric output signal to another device. The direct input audio signal or the direct electric output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, e.g. LE audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector (or estimator) for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may further comprise other relevant functionality for the application in question, e.g. compression, noise reduction, directionality, feedback control, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid configured to be worn by a user is furthermore provided by the present application. The method comprises

- providing at least one input audio signal representative of sound,
- providing at least one processed input audio signal in dependence of said at least one input audio signal;
- analyzing said sound in said at least one input audio signal, or in a signal originating therefrom, and providing a sound scene control signal indicative of a current sound environment;
- providing a notification signal in response to a notification request signal indicative of a request for conveying a (specific) message to the user; and
- presenting stimuli perceivable as sound to the user, where said stimuli are determined in dependence of said at least one processed input audio signal and said notification signal.

The method may further comprise that the notification signal is determined in response to the sound scene control signal.

In other words, the notification signal is determined in response to the notification request signal and the sound scene control signal). The notification request signal may be configured to control the specific message intended to be conveyed to the user by the notification signal. The sound scene control signal may be configured to control the specific type of the notification signal (spoken (e.g. 'battery low'), non-spoken (e.g. beeps, sound images, etc.), or a combination thereof).

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

The binaural hearing aid system may e.g. be configured to present a notification monaurally, or binaurally in dependence of a current acoustic environment, an estimated priority of the message conveyed by the notification and/or a physical or mental state of the user. The binaural hearing aid system may e.g. be configured to present a notification to the user in a different spatial location depending on the message conveyed by the notification (e.g. by applying appropriate acoustic transfer functions (HRTFs) between the left and right hearing aids of the binaural hearing aid system to the signals presented at the left and right ears, respectively, of the user.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
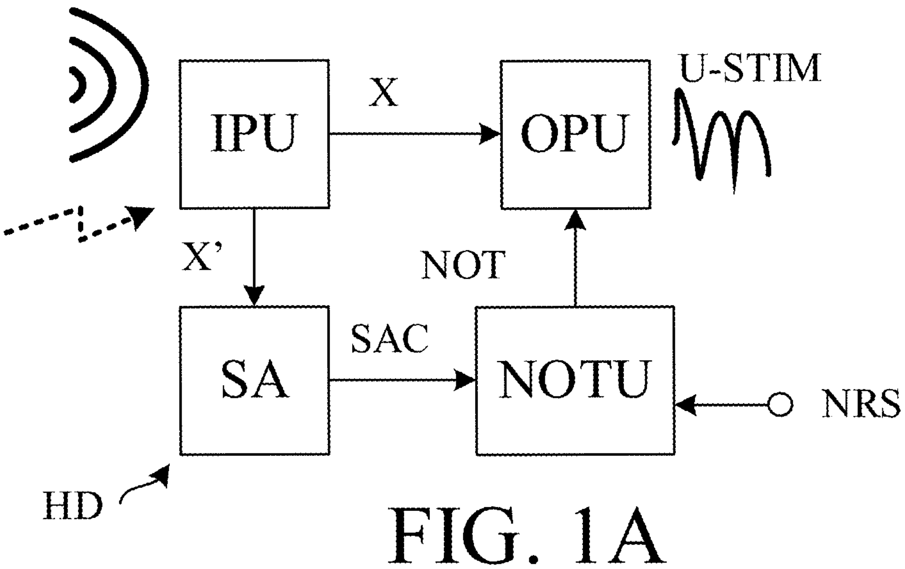
FIG. 1A, 1B, 1C, 1D, 1E, 1F schematically illustrates six different exemplary embodiments of a hearing aid comprising a notification unit according to the present disclosure, FIG. 2 schematically illustrates a further exemplary embodiment of a hearing aid comprising a notification unit according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. The disclosure relates e.g. to the handling of notifications (e.g. spoken notifications) of the user in different acoustic situations. Audible indicators (notifications) may represent short sound audible cues played back by a hearing instrument to the user, e.g. to inform the user about internal state changes of the hearing instrument. The indicators are typically mixed into the signal path of the hearing instrument and presented simultaneously with other processed input sources to the user, e.g. sound from the environment picked up by the microphone inlets and/or streamed sounds.

It is of fundamental importance that notifications are clearly distinguishable from other environmental sounds, as they may convey critical information to the user about the state of their hearing instruments. If that is not the case, the user may misinterpret or completely miss the indicators, and thereby miss out on actions required by them to continue optimal use of their hearing instrument(s). On the other hand, in some situations it may be important for the user to maintain uninterrupted attention to other input sources, e.g., to an ongoing conversation in their environment or a podcast streamed from a telephone. Therefore, notifications should be as discreet, short, and simple to interpret as possible, so that they do not draw away the attention of the user from other listening targets more than necessary.

Notifications can be classified into the following two types: 1) spoken notifications and 2) non-spoken notifications (sounds), such as beeps (e.g. tones) or jingles. In general, beeps and jingles are short, concise, and clearly distinguishable from environmental sounds when designed properly. Their meaning is however not self-explanatory, and the user must memorize the different patterns and their meanings. On the other hand, the meaning of spoken indicators is easy to understand, yet they can be more difficult to distinguish from environmental sounds, especially during a conversation.

Steering of Notification Indicator Type in Dependence of Properties of the Signal Currently Presented to the User:

Due to the differences in their perceived acoustic properties, the utility of the two indicator types (spoken notifications and non-spoken notifications (e.g. beeps or jingles)) depends on the acoustic scenario in which they are presented. In some scenarios, it may be more beneficial to use one or the other indicator type to obtain optimal user experience and to balance the trade-off between interruption and need-for-understanding. In the following, an indicator selection strategy is outlined which is aimed to balance this trade-off by assessing the sound environment in which the indicators are to be presented.

FIG. 1A, 1B, 1C, 1D, 1E, 1F schematically illustrate six different exemplary embodiments of a hearing aid (or a headset) comprising a notification unit according to the present disclosure.

Common for the five embodiments depicted in FIG. 1A-1F, and as e.g. illustrated in FIG. 1A, is that they schematically show a hearing aid (HD) configured to be worn by a user. The hearing aid (HD) comprises an input processing unit (IPU) comprising at least one input transducer for providing at least one input audio signal representative of sound. The input processing unit (IPU) provides at least one processed input audio signal (X) in dependence of the at least one input audio signal. The at least one input transducer may comprise a microphone (cf. acoustic 'wavefront'-indication in the left part of FIG. 1A, 1B) for converting sound in the environment of the hearing aid to an input audio signal representing the sound. The at least one input transducer may alternatively or additionally comprise a transceiver for receiving a wired or wireless signal (cf. dashed zig-zag arrow in the left part of FIG. 1A, 1B) comprising audio and for converting the received signal to an input audio signal representing said audio. The hearing aid further comprises a sound scene analyzer (SA) (e.g. a sound scene classifier) for analyzing (e.g. classifying) the sound from the at least one input audio signal, or from a signal originating therefrom, (X'), (e.g. into one of a number (e.g. a plurality) of sound scene classes) and providing a sound scene control (e.g. classification) signal (SAC) indicative thereof. The hearing aid further comprises a notification unit (NOTU) configured to provide a notification signal (NOT) in response to a notification request signal (NRS) indicative of a request for providing a notification to the user to thereby convey a, e.g. specific intended, message to the user. The hearing aid further comprises an output processing unit (OPU) for presenting stimuli perceivable as sound to the user, where said stimuli are determined in dependence of said at least one processed input audio signal (X) and said notification signal (NOT). The stimuli are indicated by the symbolic waveform (denoted U-STIM) in the right part of FIGS. 1A and 1B. The stimuli may be acoustic, e.g. vibrations in air (from a loudspeaker of an air conduction type of hearing aid) or vibrations in tissue or bone (from a vibrator of a bone conducting type of hearing aid). The stimuli may, however, also be electric, e.g. from a multi-electrode array of a cochlear implant type of hearing aid. The stimuli may also originate from wireless receivers such as Bluetooth, e.g. for transmission to another device or system.

The sound scene analyzer (SA) may receive the (typically digitized, possibly band-split) input audio signal (X') from a microphone or a wired or wireless audio receiver, e.g. in case only one input transducer (e.g. a microphone or an audio receiver) is active at a given time. The sound scene analyzer (SA) may receive a processed signal (X', X), e.g. a beamformed signal, or a mixed signal (e.g. a mixture of a microphone signal (or a beamformed signal) and an audio signal received via an audio receiver), e.g. in case more than one input transducer is active at a given time.

The sound scene analyzer (SA) may be configured to classify the context (e.g. speech, noise, music, multi-talker, one talker in noise, etc.) of the current at least one input audio signal in a plurality of sound scene classes and to provide a sound scene control (e.g. classification) signal (SAC) indicative of a sound scene class of the current at least one input audio signal.

The sound scene analyzer (SA) may be configured to provide at least two sound scene classes, e.g. 'speech-dominated' or 'non-speech-dominated'. A least two sound scene classes is intended to include a binary indicator (e.g. SPEECH, NO SPEECH), or effectively only comprising a single class, e.g. a particular category or "nothing", e.g. SPEECH or NONE, where NONE may or may not be SPEECH (i.e. unknown).

The sound scene analyzer (SA) may be configured to classify the sound in the at least one input audio signal, or in a signal originating therefrom, according to a level of the signal. The hearing aid, e.g. the input processing unit (IPU) or the sound scene analyzer (SA) may comprise a level detector (or estimator) for detecting (or estimating) a level of the at least one input audio signal or of a signal originating therefrom. The sound scene analyzer (SA) may be configured to provide a plurality of sound scene classes, each class being indicative of a different level or level range of the at least one input audio signal, or in a signal originating therefrom. The number of sound scene classes may be larger than 2, e.g. larger than 3, e.g. larger than 5. The number of sound scene classes may be in the range from 2 to 10, or more than 10, or a continuous parameter, e.g. level. The sound scene analyzer may be configured to provide a level indication (and not different classes; or different classes correspond to different levels) as an output (i.e. a continuous or multi-valued parameter), see e.g. FIG. 5A-E. In that case, the level estimates (horizontal axis) are not interpreted as a categorical variable, but rather as a continuous parameter.

Instead of (or in addition to) the sound scene analyzer a more general 'situation analyzer' for analyzing an environment (e.g. including (or exclusive of) the acoustic environment) around the user and/or a physical or mental state of the user, and providing a situation control signal (SAC, LE, Ly, Ly', Lx, Lwx) indicative thereof may be applied in any of the embodiments of FIG. 1A, 1B, 1C, 1D, 1E, 1F, FIG. 6, FIG. 7, FIG. 8A, 8B, 8C, and FIG. 9.

The hearing aid (HD), e.g. the notification unit (NOTU), may be configured to select a type of notification signal in dependence of the sound scene control signal (SAC) (or a situation control signal from the situation analyzer). The type of notification signal may comprise a spoken notification, or a non-spoken notification, e.g. a beep or jingle, or mixture of the two. The notification unit (NOTU) may be configured to generate a notification signal comprising a combination of a spoken notification and a non-spoken notification. The combination may e.g. be a sequential mixture (e.g. a non-spoken notification followed by a spoken notification). The non-spoken notification may e.g. be configured to attract the user's attention to the subsequent spoken notification.

The notification request signal (NRS) may be generated by a notification controller, e.g. external to, or forming part of, the notification unit (NOTU) or of a processor of the hearing aid (e.g. forming part of the output processing unit (OPU)). The notification controller may be connected to one or more detectors or sensors providing status of control signals indicative of the status or changes to parameters (assumed to be) of interest to the user, and/or which may be important for the functionality of the hearing aid. Examples of such status or control signals may e.g. be a battery status signal, e.g. indicative of a remaining battery capacity (e.g. expressed as an estimated rest time for normal operation without changing or recharging a battery). Other examples of such status or control signals may be a volume status signal or a hearing aid program status signal, both e.g. initiated by a change of the parameter in question (here, volume or program), e.g. by the user. The notification controller may be connected to a user interface of the hearing aid. Changes of volume or hearing aid program may e.g. be activated via a user interface of the hearing aid (e.g. a button, or an APP). The user interface (e.g. an APP, e.g. executed on an auxiliary device) may e.g. be adapted to allow the user to configure the notification unit, e.g. to determine the timing of, or threshold values for, providing a given notification to the user.

Figure 1B:
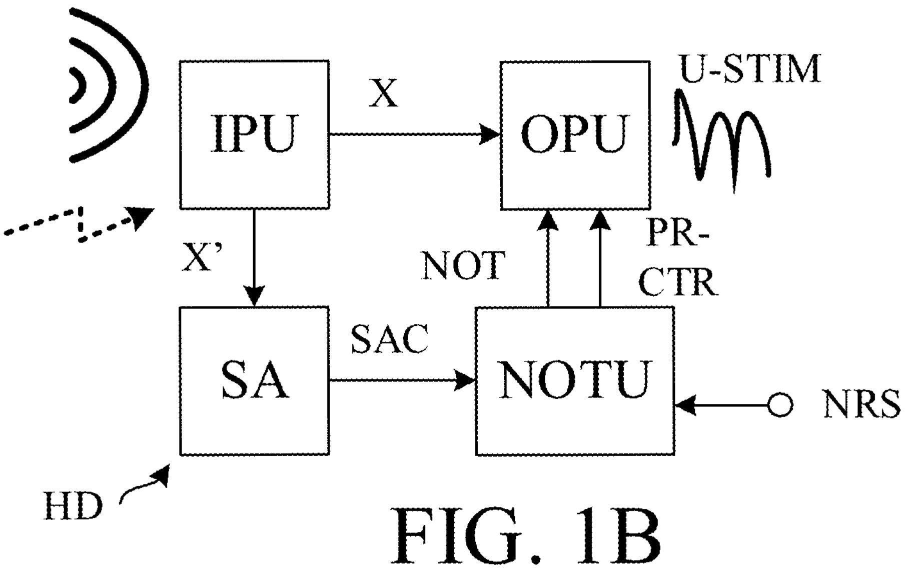

FIG. 1B shows a hearing aid (HD) as shown in FIG. 1A. In the embodiment of FIG. 1B, however, the notification unit (NOTU) may further be configured to provide a notification signal (NOT) as well as a notification processing control signal (PR-CTR) in response to the notification request signal (NRS), wherein the notification signal (NOT) and the notification processing control signal (PR-CTR) are determined in response to the sound scene control signal (SAC). Both signals are forwarded to the output processing unit (OPU). The notification processing control signal (PR-CTR) may e.g. be configured to control processing of the notification signal (NOT) in the output processing unit (OPU), e.g. to control the gain applied to the notification signal (e.g. relative to a level of the processed input audio signal (X) received from the input processing unit (IPU)).

Figure 1C:
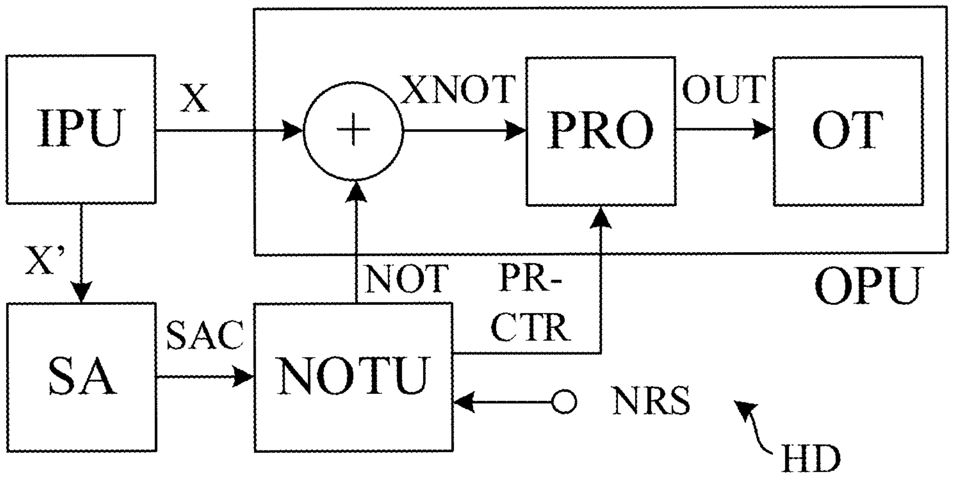

FIG. 1C shows a hearing aid (HD) as shown in FIG. 1B. In the embodiment of FIG. 1C, however, the output processing unit (OPU) specifically indicates to comprise a hearing aid processor (PRO). The hearing aid processor (PRO) may comprise a compressor (e.g. executing a compressive amplification algorithm) for applying a level and frequency dependent gain to the processed input audio signal (X) to the hearing aid processor provided by the input processing unit (IPU) (or to a signal originating therefrom), e.g. to a signal (XNOT) comprising (or based on) a combination of the notification signal (NOT) and the processed input audio signal (X) provided by a combination unit ('+'), e.g. a summation unit (as shown in FIG. 1C). The notification processing control signal (PR-CTR) from the notification unit is forwarded to the hearing aid processor and e.g. configured to control or influence a gain applied to the combined signal (XNOT), e.g. in dependence of the type of notification signal (spoken, non-spoken or a combination). In case the notification signal (NOT) is a combination of a non-spoken signal (e.g. beeps) and a subsequent spoken signal, the gain to the combined signal comprising the non-spoken part of the notification signal may be larger than the gain applied to the combined signal comprising the spoken part of the notification signal, to focus the user's attention to the (subsequent spoken part of the) notification signal. The output processing unit (OPU) is further specifically indicated to comprise an output transducer (OT), e.g. a loudspeaker, or a vibrator, or an electrode array, for presenting stimuli to the user based on a processed signal (OUT), e.g. received from the hearing aid processor (PRO). The output transducer may, alternatively or additionally, comprise a transmitter for transmitting the processed signal (OUT) to another device or system.

Figure 1D:
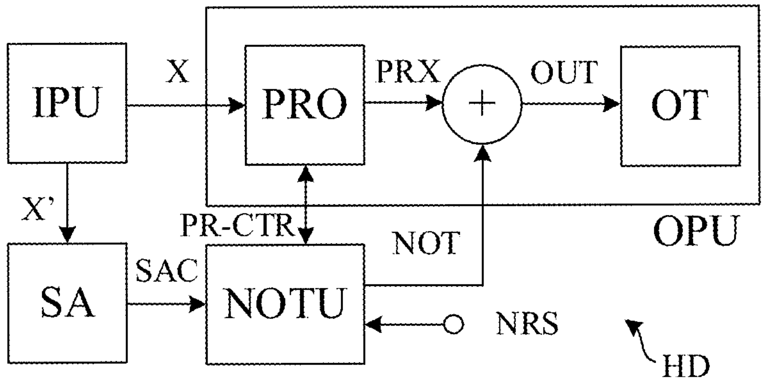

FIG. 1D shows a hearing aid (HD) as shown in FIG. 1C. In the embodiment of FIG. 1D, however, the order of the combination unit ('+') and the hearing aid processor (PRO) in the output processing unit (OPU) has been reversed. Further, the notification signal (NOT) has been processed in the notification unit, e.g. an appropriate gain has been applied in dependence of the sound scene control signal (SAC, e.g. a level of the input audio signal or the processed input audio signal (X'; X)) to provide the processed notification signal (NOT). The processed input audio signal (X) from the input processing unit (IPU) to the hearing aid processor (PRO) is processed in the hearing aid processor (PRO) and an appropriate gain has been applied to provide the hearing aid processed input signal (PRX). A level of the hearing aid processed input signal (PRX) may have been decreased during presence of the notification signal in response to the notification processing control signal (PR-CTR) from the notification unit (cf. e.g. FIG. 4). The processed notification signal (NOT) and the hearing aid processed input signal (PRX) are combined in the combination unit ('+') providing a resulting processed signal (OUT) which is fed to the output transducer (OT) for presentation to the user or transmission to another device or system.

Figure 1E:
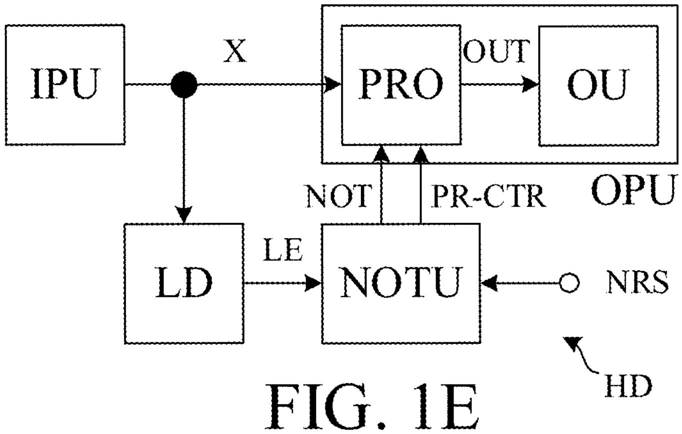

FIG. 1E shows a hearing aid (HD) as illustrated in FIG. 1C. In the embodiment of FIG. 1E, however, the hearing aid processor (PRO) of the output processing unit (OPU) may comprise the combination unit ('+') of FIG. 1C. In the embodiment of FIG. 1E, the combination unit may be located before or after the (further) processing (e.g. compression) of the processed input audio signal (X). Another difference is that the sound scene analyzer (SA) of FIG. 1C is embodied in a level detector (or estimator) (LD) for detecting (or estimating) a level (LE) of the at least one input audio signal or of a signal originating therefrom, here the processed input audio signal (X). The level detector (LD) may be configured to provide an estimate of the level of the input signal to the level detector as a continuous parameter or as one of a plurality 'level classes', each class being indicative of a different level or level range of the at least one input audio signal, or of a signal originating therefrom (here processed input audio signal X). In the notification unit (NOTU) and/or in the processor (PRO), the level (and/or other properties) of the notification signal (NOT) is (are) controlled with a view to the level of competing signals' (here the processed input audio signal (X)). The notification processing control signal (PR-CTR) provided by the notification unit (NOTU) to the processor (PRO) may contain instructions to the processor to apply a specific gain (e.g. an attenuation) to the processed input audio signal (X), when the notification signal (NOT) is present (cf. e.g. FIG. 4).

Figure 1F:
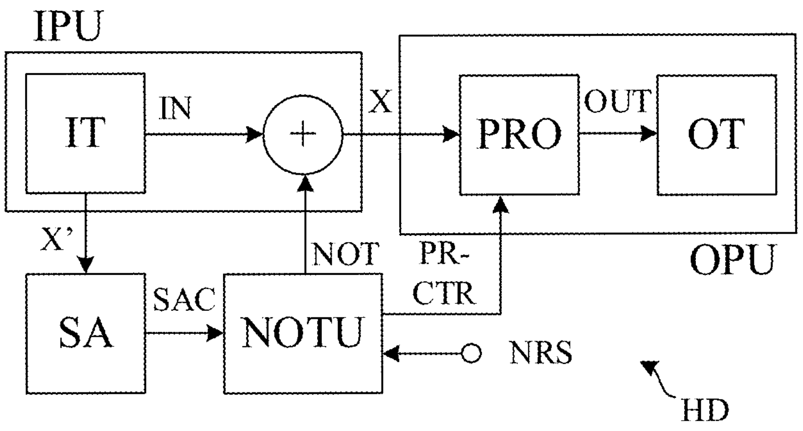

FIG. 1F shows a hearing aid (HD) as illustrated in FIG. 1C. In the embodiment of FIG. 1F, however, the input processing unit (IPU) comprises an input transducer (IT) and the combination unit ('+') of FIG. 1C. Thereby the processed input audio signal (X) from the input processing unit (IPU) to the processor (PRO) of the output processing unit (OPU) comprises a mixture of the input audio signal (IN) provided by input transducer (IT) (e.g. a microphone) and the (possibly processed) notification signal (NOT). As in the embodiment of FIG. 1C, a notification processing control signal (PR-CTR) from the notification unit (NOTU) is forwarded to the hearing aid processor (PRO), and e.g. configured to control or influence a gain applied to the combined signal (X), e.g. in dependence of the type of notification signal (spoken, non-spoken or a combination).

Figure 2:
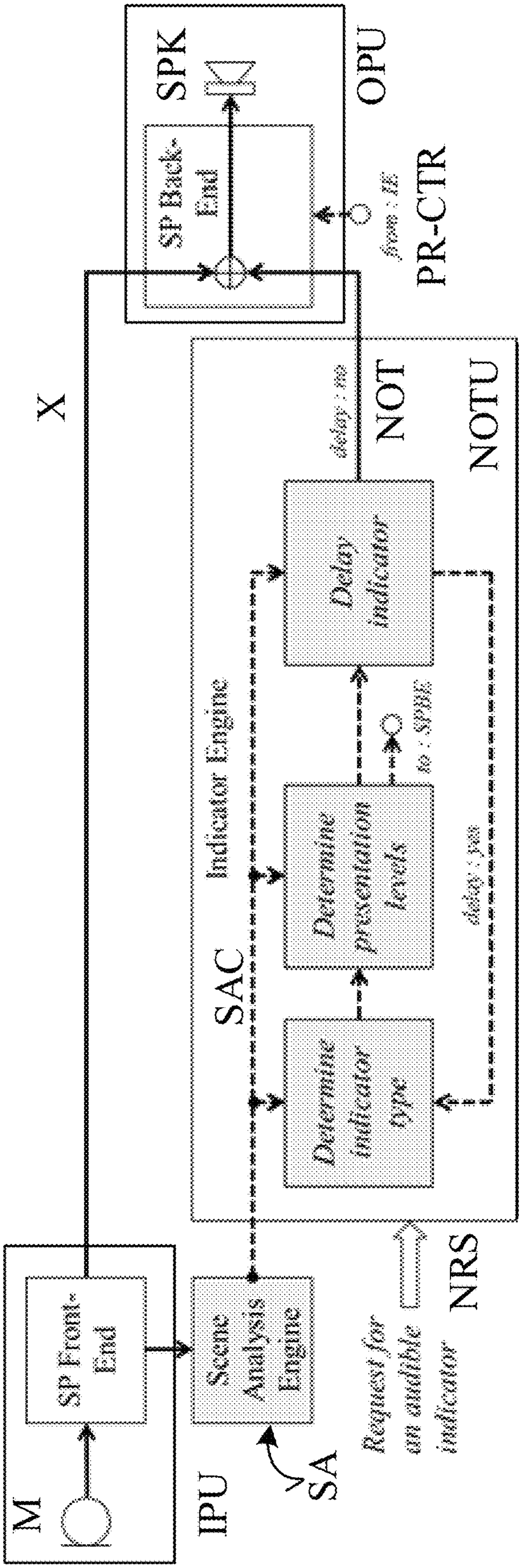

In the following, among other features, an algorithm that intelligently chooses between spoken or non-spoken indicators to be presented to the user, to optimize usability depending on the acoustic scenario, is proposed (the reference names used in FIG. 2 are put in quotation marks ('x'), e.g. 'Indicator Engine', when used in the following description of FIG. 2).

FIG. 2 schematically illustrates a further exemplary embodiment of a hearing aid comprising a notification unit according to the present disclosure. FIG. 2 may be seen as a block diagram of processing blocks of an exemplary algorithm for intelligently choosing between spoken or non-spoken indicators to be presented to the user. In FIG. 2, solid lines represent acoustic signal paths (e.g. time- or frequency-domain signals), while dashed lines represent control-signal paths (e.g. time- or frequency-domain signals).

The proposed algorithm comprises two sub-systems:

1) 'Scene Analysis Engine' (equivalent to the sound scene analyzer, SA, of FIG. 1A-1F): This sub-system is responsible for the analysis of the acoustic scenario in which the user is situated at the time a notification is to be presented. It categorizes the sound scene as either speech-dominated or not speech-dominated. The scene analysis engine may additionally (or alternatively) provide the sound scene signal level, e.g. represented by an estimate of the level of the at least one input audio signal (or a signal originating therefrom). The scene analysis engine may in general provide properties of the at least one input audio signal (or a signal originating therefrom), e.g. a category, or other parameters of the signal, e.g. its level.

2) 'Indicator Engine' (equivalent to the notification unit, NOTU, of FIG. 1A-1F): This sub system presents the intended notification based on the output of the 'Scene Analysis Engine', and the 'request for a notification' (NRS). It is responsible for determining the type of the notification (non-spoken or spoken) and additional indicator tones (if any), the level scaling of the chosen indicator(s) and other input signal(s) in the signal path (e.g., the applied gains or signal-to-noise ratios) and the timing of the indicator(s), e.g. insertion of a delay.

The processing steps of the proposed algorithm may be as follows:

1) Signals recorded (picked-up) on the input side (here exemplified by microphone (M)) are processed by a Signal Processing Front End ('SP Front-End') block. The microphone (M) and 'SP Front-End' form part of the input processing unit (IPU), which converts the input signal(s) from the microphone (M) (etc.) into at least one time- or frequency domain electric signal. Signals on the input side may be acoustic signals recorded by at least one acoustic input transducer (e.g. microphone (M)), electro-magnetic field signals recorded by at least one induction pick-up coil or digital signals received via a Bluetooth receiver, among others, e.g. similar short range (proprietary or standardized) wireless communication technologies (e.g. Bluetooth Low Energy or UWB).

2) The electric signal(s) is(are) routed to the Scene Analysis Engine (SA) and the Signal Processing Back-End ('SP Back-End') of the output processing unit (OPU).

3) The 'Scene Analysis Engine' (SA) analyzes the signal (s) provided by the 'SP Front-End' and provides parameters that will be consumed by the 'Indicator Engine' to determine the type and presentation mode of notifications. These parameters can be either discrete labels (labeling the input signal as e.g., speech dominated or not speech-dominated) or continuous parameter(s) (e.g., signal level), or a combination of both.

4) The parameters provided by the 'Scene Analysis Engine' (SA) are routed to the 'Indicator Engine' (notification unit, NOTU). When the 'Indicator Engine' receives a request from the system (cf. notification request signal (NRS)) to audibly indicate an event (e.g., a change in volume level, activation of flight mode, low battery status, etc.), the 'Indicator Engine' may perform at least one (e.g. all) of the following processing steps:

4a. 'Determine indicator type'. This block is responsible for selecting an appropriate indicator type to be used for the requested notification. For example, if the acoustic scene is dominated by speech-like cues, the 'Indicator Engine' can decide to use non-spoken notifications to assure that the notifications sufficiently stand out from the acoustic environment they are presented in. This block can also select a combination of indicator types. E.g., if the system is configured to only use spoken notifications and the acoustic scene is dominated by speech-like cues, this block can decide to present an additional attention tone before playing the spoken notification, thereby notifying the user that a spoken indicator is on its way. If in the same system the 'Scene Analysis Engine' assesses the acoustic scene as mainly being quiet, this block may decide to use the corresponding spoken indicator without an additional attention tone.

4b. 'Determine presentation levels'. This block is responsible for scaling selected indicator(s) to an acceptable level, depending on the acoustic scene and on the type of indicator. It may also provide a control signal to (cf. e.g. output 'to: SPBE', and input processing control signal (PR-CTR) to) the 'SP Back-End', to offer further control of the signal paths in the 'SP Back-End', e.g., for scaling the presentation levels of signals other than the notifications.

A concrete example of a processing scheme could be as follows: it is well known that signals with similar frequency content but different statistical properties (such as speech vs speech shaped noise) mask (target) speech differently. For example, speech masks speech to a greater degree than speech-shaped noise (with matched magnitude spectrum) masks speech. Put in another way, the optimal signal-to-noise ratio (SNR) margin at which notifications are intelligible to users depend on the interaction between indicator type and acoustic scene. Therefore, the role of the 'Determine-presentation-levels'-block may be to adjust the SNR at which the notification is presented, depending on the indicator type and the acoustic scene. The hearing aid may be configured to adaptively determine the SNR margin (e.g. using an adaptive filter).

4c. The 'Delay indicator' block can delay the presentation of the indicator based on the input from the 'Scene Analysis Engine', e.g., to a point in time when the environmental noise level reduces below a certain threshold. The 'Delay indicator' block may also keep the history of delays associated with the requested notification, to assure that the indicator will not be delayed more than a predetermined maximum delay. The 'Delay indicator' block may also provide a control signal (cf. 'delay: yes') feeding back to the 'Determine indicator type' block to restart the processing chain within the 'Indicator Engine'.

5) The signal provided by the 'SP Front-End' (X, sounds (e.g. (pre-)processed sounds) from the input sources) and by the 'Indicator Engine' (the notification, NOT) are mixed in the 'SP Back-End' block, further processed (e.g., amplified, output-limited, etc.) and delivered to the ears of the end user. The processing scheme applied by the 'SP-Back-End' block may depend on the control input (PR-CTR) coming from the 'Indicator Engine'.

For hearing instruments, environmental sound may be picked up by microphones, amplified and played back to the user. In addition to this, for open/vented fittings, there may be a significant amount of direct sound from the environment leaking into the ear through the earpiece.

Therefore, when a notification is presented, the user will be exposed to sound from multiple sources: SN+$S_{direct}$+$S_{amp}$, where SN is the (e.g. spoken) notification generated and played back in the hearing instrument. It is assumed that, while playing, the notification is the active listening target ('target sound') by the user. Further, $S_{direct}$ is the direct sound from the environment leaking through the earpiece to the eardrum, and $S_{amp}$ represents the input sources (other than the (spoken) notifications), amplified by the hearing instrument and delivered through the speaker(s) of the hearing instrument(s) to the ear of the user. Most of the time this will be the amplified environmental sound picked up by the microphone(s) of the hearing instrument. It may also include streamed sounds, e.g., a music stream played back by a smartphone (or other audio delivery device) via the hearing instruments.

In short, other sound sources ($S_{amp}$ and $S_{direct}$) will be present at the same time as the (e.g. spoken, SN) notification is played back and will therefore mask the (spoken) notification, making it more difficult for the user to perceive (decode or understand). The lack of context normally provided by visual cues only amplifies the issue. In environments with loud background sounds, this may even cause the user to misunderstand the (spoken) notification or miss it completely. At the same time, it needs to be ensured that the (spoken) notifications are played at a comfortable level, i.e., they should not startle or overwhelm the listener in the environment they are in.

While the solution presented in the following was originally designed with spoken notifications in mind, it can also be applied to other types of audible indicators, e.g., tonal indicators (e.g. 'beeps').

For simplicity, in the examples below $S_{amp}$ will consist only of a microphone input source (i.e. 'background noise' (=environmental sound) picked up by one or more microphones)—but the solution generalizes to a mixture of input sources. In the generic case, the level estimate of $S_{amp}$ is assessed on the mixture of all input sources (e.g. background noise picked up by the microphone+streamed sources), and not only on the microphone input.

To solve the problem of environmental background noise masking the spoken notification to a degree where it becomes unintelligible for the user, an algorithm is proposed comprising two parts.

One part may adjust the level of the spoken notification by applying a positive gain to the spoken notification (SN) based on an estimate of the background noise level (cf. section Level steering of notifications (SN) based on background noise estimates' below, cf. e.g. FIG. 3).

The other part of the algorithm may apply a negative gain to the other controlled input source, ($S_{amp}$) potentially with a gain factor that may be dependent on the background noise level estimate (cf. section 'Level steering of sound from input sources ($S_{amp}$) during playback of notifications (SN)' below, cf. e.g. FIG. 4).

Level Steering of Notifications (SN) Based on Background Noise Estimates:

Sounds generated (picked up) by the hearing instrument are amplified to ensure audibility through a hearing loss compensation (HLC) algorithm (e.g. compressive amplification). Typically, in hearing instruments audible notifications are calibrated to be presented at a comfortable input level (e.g. corresponding to the level of conversational speech in the case of spoken notifications), and then amplified by the HLC algorithm to assure audibility. The level steering algorithm described here may be seen as an additional amplification applied to the SN on top of the normal HLC.

The level steering algorithm will try to compensate for the background noise, (where the background noise level is the input level from the environment as measured at the microphone input) by increasing the level of the spoken notification whenever there is significant background noise. The specific gain applied to the spoken notification may depend on the estimated background level such that the spoken notification level will increase the more background noise there is. The gain may be limited between a lower limit, e.g. (as in FIG. 3) 0 dB, and an upper limit, e.g. (as in FIG. 3) 10 dB, to ensure that it will never be too loud, even though the background noise might be very loud.

Figure 3:
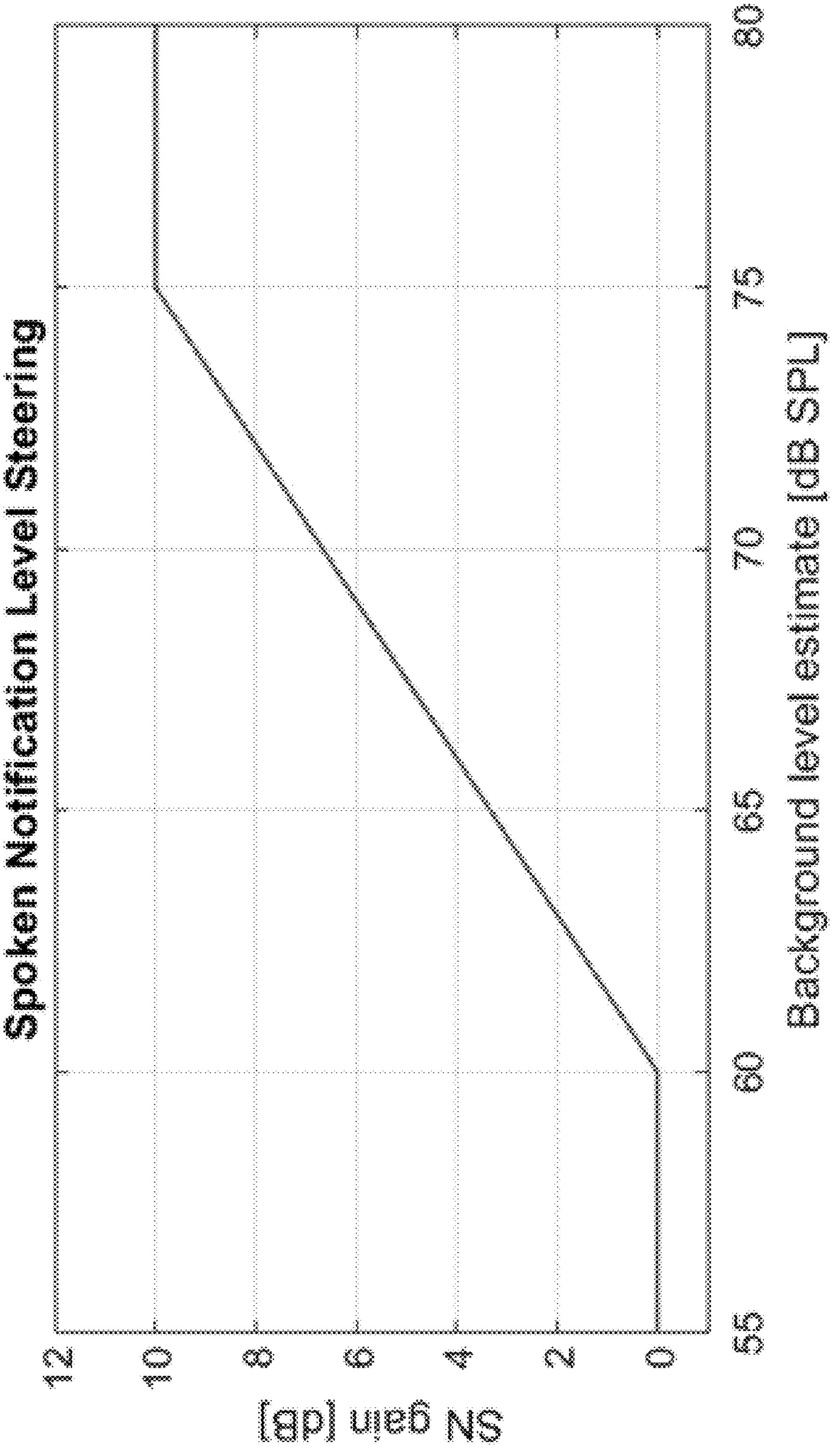
FIG. 3 shows an exemplary relationship between an estimated background noise level and the gain applied to a notification.

FIG. 3 schematically illustrates an exemplary relationship between an estimated background noise level and the gain applied to a notification, e.g. a spoken notification.

FIG. 3 shows the additional gain (over the compressor gain) (cf. the vertical axis denoted 'SN gain [dB]') applied to the spoken notification signal in dependence of the background noise level (cf. horizontal axis denoted 'background level estimate [dB SPL]').

The spoken notification signal may have a default level, that is adjusted by the level steering algorithm. This may be done before or after compression.

The spoken notification signal may e.g. have a predefined default level, e.g. a medium setting. For non-spoken notifications (e.g. beeps) it may e.g. correspond to 75 dB RMS (78 dB SPL) (+/−1 dB) equivalent input level of a calibrated system. For speech, the essence is that the default level is an equivalent input level, that then goes through the compression/gain map with all the other inputs, and the level steering may apply additional gain to the spoken notification (SN) after the compression/gain map. The level steering gain may also be applied to the spoken notification before the compression/gain map, after which it is added to the other inputs and subsequently passes the compression system together with the other inputs.

In the example of FIG. 3, the background noise must reach a certain minimum level, e.g. 60 dB, before the level steering algorithm increases the (e.g. spoken, e.g. default) notification level. Likewise, the level steering algorithm may stop increasing the (e.g. spoken, e.g. default) notification level when the background noise level is above a certain maximum level, e.g. 75 dB.

The background noise level estimate is based on the signal picked up by the microphones of the hearing instrument. This estimate can be as simple as reading out a level estimate from one particular (microphone) channel, or it can be an aggregated measure over multiple channels (e.g. all). It can even include an estimate of Sailed based on the hardware characteristics of the hearing instrument, or by direct means of measuring it, e.g., by a microphone located in the ear canal.

The gain may be calculated and applied to the notification signal (SN) at the moment the notification is triggered and may be configured not to change while the notification is played. The spoken notifications are intended to be relatively short, e.g. less than 5 s, or less than 3 s (or ≤2 s, or ≤1 s).

Level Steering of Sound from Input Sources (Same) During Playback of Notifications (SN):

The damping algorithm will temporarily apply a negative gain (in a logarithmic representation; or a gain below 1 in a linear representation) to the (processed) input sources ($S_{amp}$) for the duration while the spoken notification is played back to the user (as e.g. indicated by the notification request signal). This is illustrated in FIG. 4, where it can be seen how the gain factor applied to other input sources ($S_{amp}$) changes to a negative value while the spoken notification is played.

Figure 4:
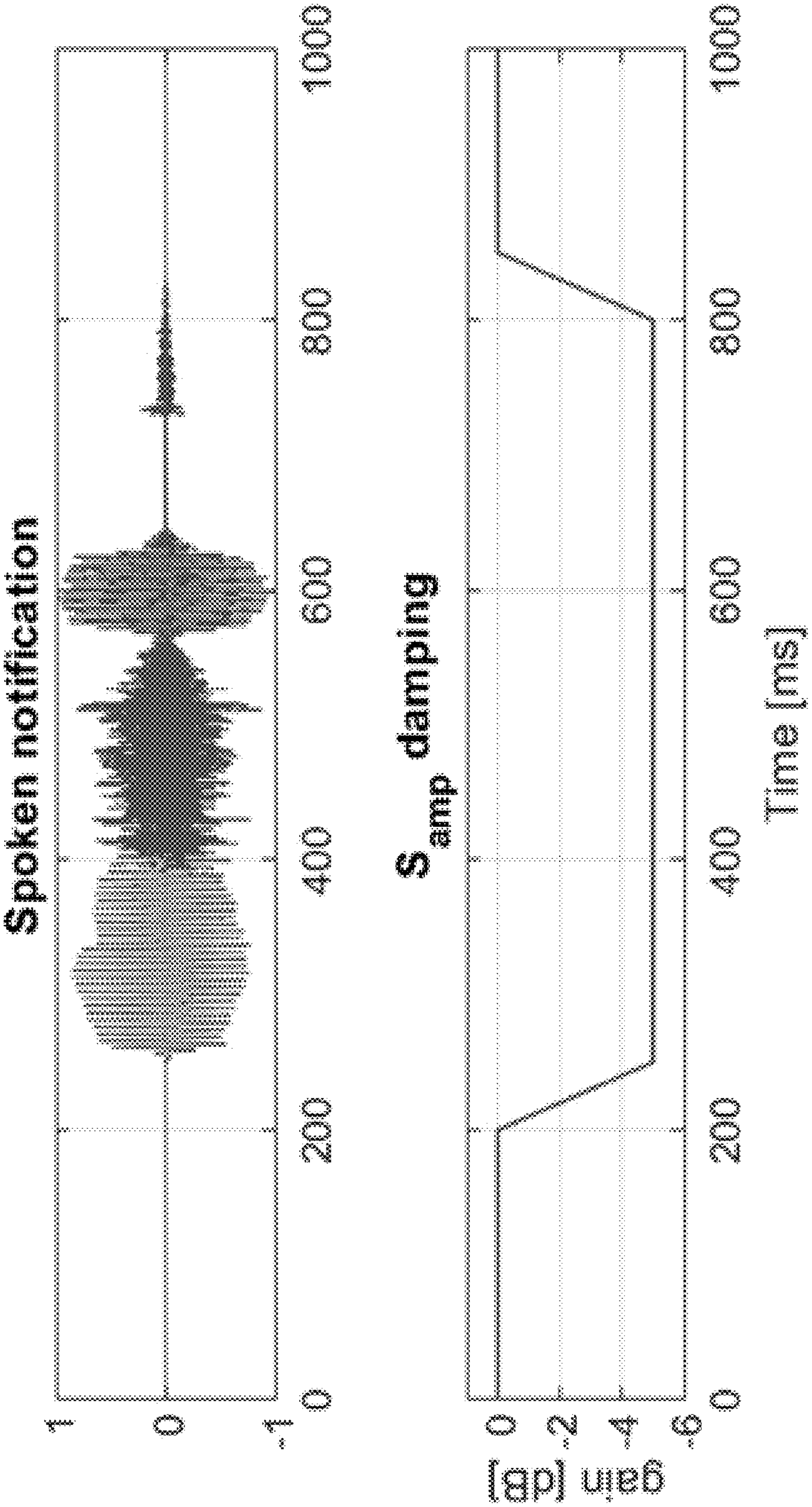
FIG. 4 shows the damping applied to other input sources when a notification is played as a function of time.

FIG. 4 shows the damping applied to other input sources when a notification is played as a function of time. The top pane shows the waveform versus time (ms) of a spoken notification, and the bottom pane shows the gain factor ('gain [dB]') applied to other input sources ($S_{amp}$) up to, during and just after the notification. The gain factor may e.g. be selected as a constant value (e.g. −5 dB as in FIG. 4), or it could be made adaptive and depending on the estimated background noise level in a similar way to the spoken notification level steering algorithm (cf. e.g. FIG. 3).

Strategies for Combining Level Steering and Input Source Dampening:

The combination of level steering of the spoken notifications and damping of other input sources will help remove the risk of users not being able to understand the spoken notification because it will effectively increase the signal-to-noise ratio (SNR) of the spoken notification presented to the user. The SNR (in a logarithmic representation [dB]) in respect to the amplified environmental sounds can be described (approximated) as:

$$SNR(SN)=level(SN)-level(S_{amp})$$

As an approximation, the level of the directly propagated ('leaked') sound ($S_{direct}$) may be considered negligible.

In noisy background environments, the level steering part of the algorithm will increase the level of SN while the damping will decrease the level of $S_{amp}$. Both parts will increase the SNR of the presented spoken notification and thereby make it easier for the user to understand it.

Different Strategies for Combining the Two Methods can be Envisioned.

FIG. 5A, 5B, 5C, 5D, 5E shows five different exemplary combinations of Spoken Notification (SN), level steering and input source ($S_{amp}$) dampening. FIG. 5A-5E shows gain or level vs. 'background noise level', $S_{amp}$ (where the 'background noise level' in this context (ideally) includes all other audio contributions than the spoken notifications). The level of the direct sound from the environment ($S_{direct}$) leaking through the earpiece to the eardrum may e.g. be estimated by an eardrum facing microphone located in the ear canal of the user. In practice, however, the 'background noise level' used to control the spoken notifications may be less than ideal, e.g. at least comprising the level of the at least one microphone signal.

Figure 5A:
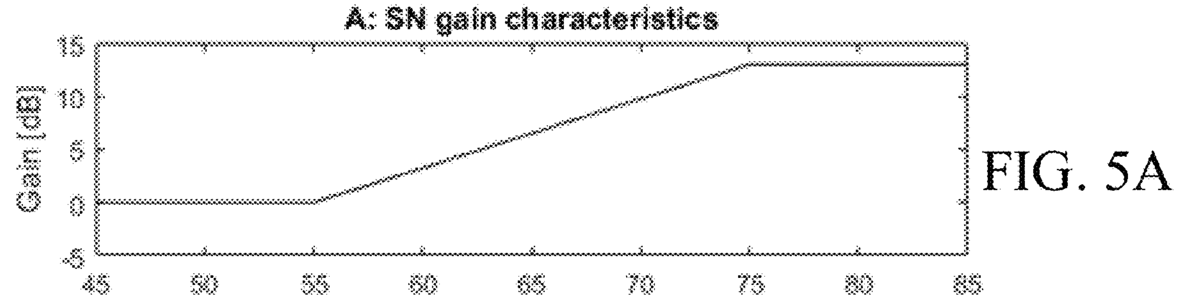
FIG. 5A, 5B, 5C, 5D, 5E shows five different exemplary combinations of Spoken Notification (SN), level steering and input source ($S_{amp}$) dampening.
Figure 5B:
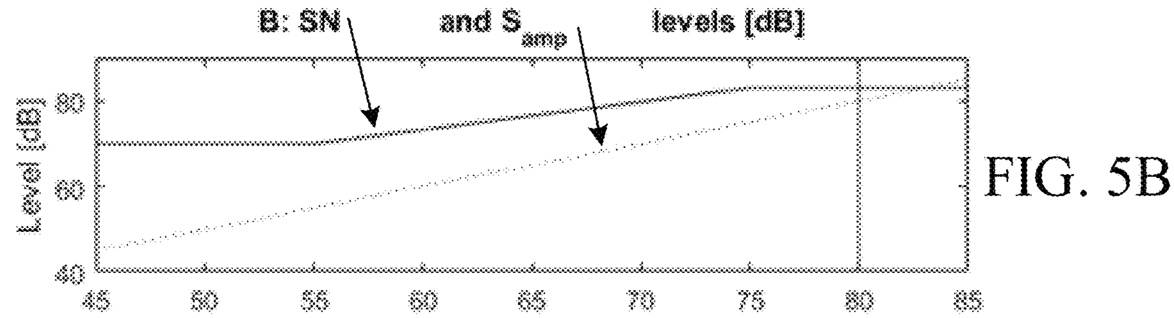
Figure 5C:
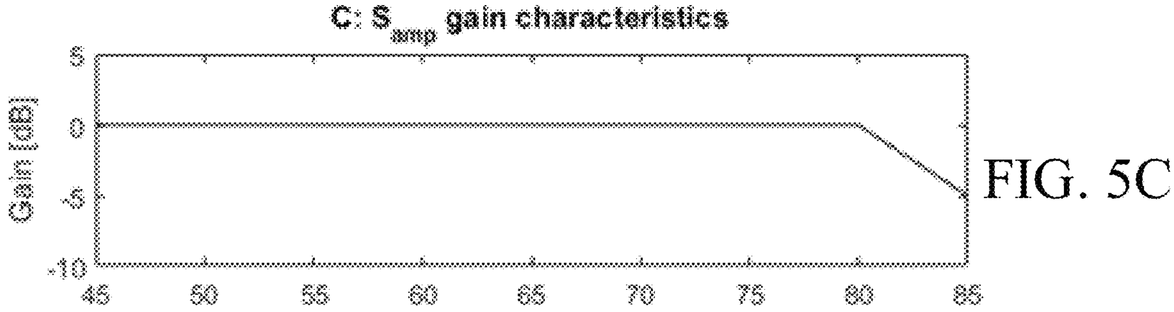
Figure 5D:
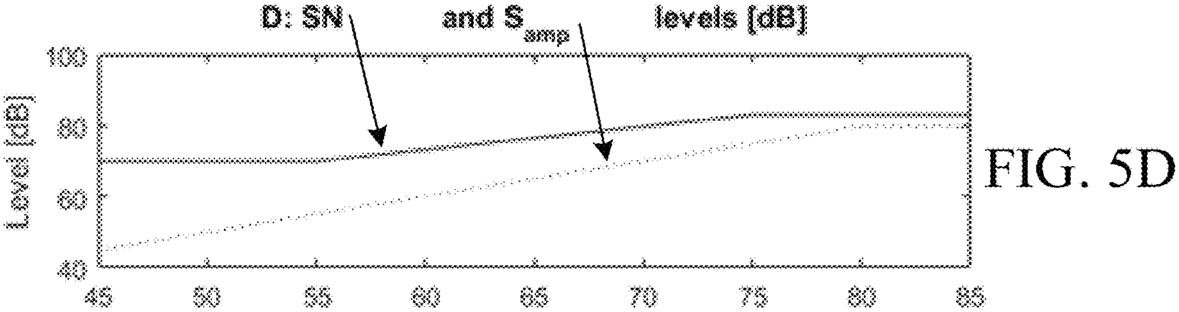
Figure 5E:
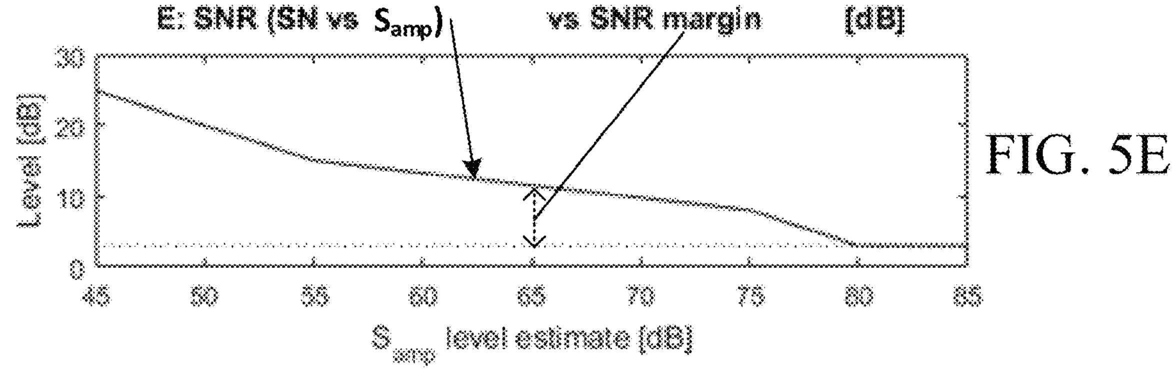

1. The level steering of the notifications (SN) may e.g. be implemented as exemplified in FIG. 3 (or similar) showing an exemplary level of spoken notifications versus 'background noise' level, where the input source(s) ($S_{amp}$) may be always dampened by a constant amount (cf. e.g. FIG. 4) or muted during the playback of notifications (e.g. spoken).
2. As it might be disturbing for the user if the input source ($S_{amp}$) is dampened (or even muted), another strategy may be to steer the dampening of these, e.g. also based on the input level. In this way, it may be ensured that the background noise is only dampened when it is necessary, i.e., in high background noise levels, when the spoken notification level is reaching saturation. FIGS. 5A and 5C show how the two gain curves for notification level (FIG. 5A) and other input source levels (FIG. 5C) can look like in such a scenario. FIG. 5A shows gain of the spoken notification signal versus the 'background noise' level, like FIG. 3, but with knee points at 55 dB and 75 dB background noise level (instead of 60 dB and 75 dB in FIG. 3) between which gain applied to the spoken notification signal is increased from 0 dB to 12 dB as seen from the notification point of view. FIG. 5B is equivalent to FIG. 5A, but shows the resulting level of the spoken notification after the applied gain, as well as the level of the 'background noise' ('y=x'), (dotted line). FIG. 5C illustrates a sample gain that may be applied to the background noise signal, e.g., based on the requirement that the SNR should always be above 3 dB. This results in a constant gain of 0 dB up to a level of 80 dB after which gain is reduced linearly (5 B pr. 5 dB). FIG. 5D shows the resulting levels of the spoken notification (SN) and the background noise ($S_{amp}$) if the two gains from FIGS. 5A and 5C are applied. FIG. 5D is therefore similar to FIG. 5B but with a 3 dB SNR margin over the full range of 'background noise' levels. FIG. 5E shows the resulting SNR of the spoken notification (SN) versus the background noise level ($S_{amp}$) (solid line), and the 3 dB margin requirement as a reference (dotted line). In both drawings, the SNR margin for a given level at the horizontal axis is reflected by the difference between the solid line graph and the dotted line graph.
3. The gain characteristics of the notifications (SN) may also depend on other characteristics of the background noise than input level. One such example could be to alter the gain characteristics of the notifications (SN) based on the frequency content of the background noise—masking may depend e.g. on the frequency overlap between SN and background.

In short, the method above can be applied in different frequency bands or pr. frequency band. The method may be mostly meaningful on the damping part on the "background noise signal" (environmental sound) as the level steering or amplification of some frequencies in the spoken notification might result in a bad signal quality of the spoken notification.

Spoken notifications typically have broadband frequency characteristics, and the level for each frequency band may be different for different spoken notifications. Similarly, background noise (i.e. sounds competing with the notification signal about the user's attention) may have broadband frequency characteristics, overlapping with that of the spoken notification. The amount to which background noise masks a spoken notification typically differs across frequency bands. The system may utilize level estimators in different bands to determine processing parameters based e.g. on the signal levels of the spoken notification, or that of the background noise, or on the signal-to-noise ratio between the spoken notification and the background noise, or on a combination of some or all of these metrics.

Figure 8A:
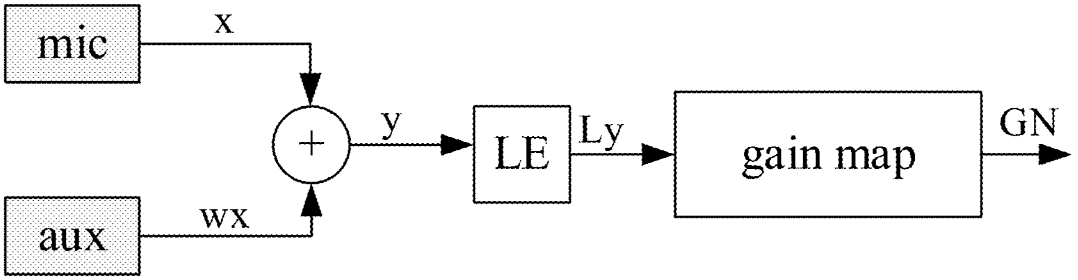
FIG. 8A, 8B, 8C shows a first, second and third scenarios of an input stage of a hearing aid comprising a notification unit wherein the input audio signals comprise a mixture of a wirelessly received (streamed) audio signal and an acoustically propagated signal picked up by a microphone (e.g. two input audio signals in the form of a streamed input audio signal and an acoustically received input audio signal)
Figure 8B:
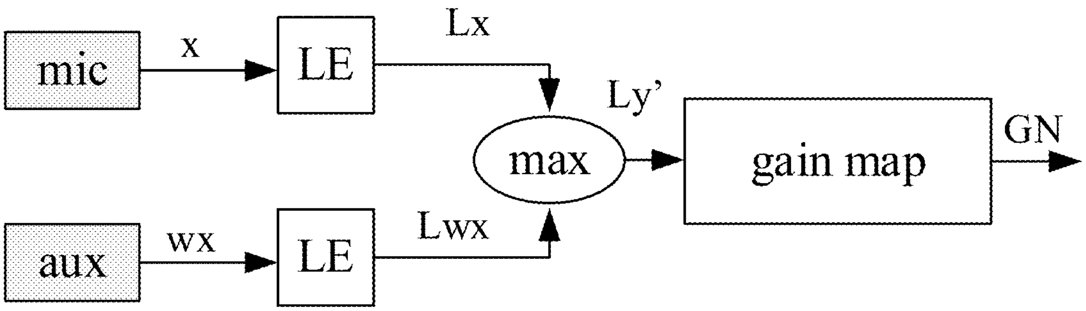
Figure 8C:
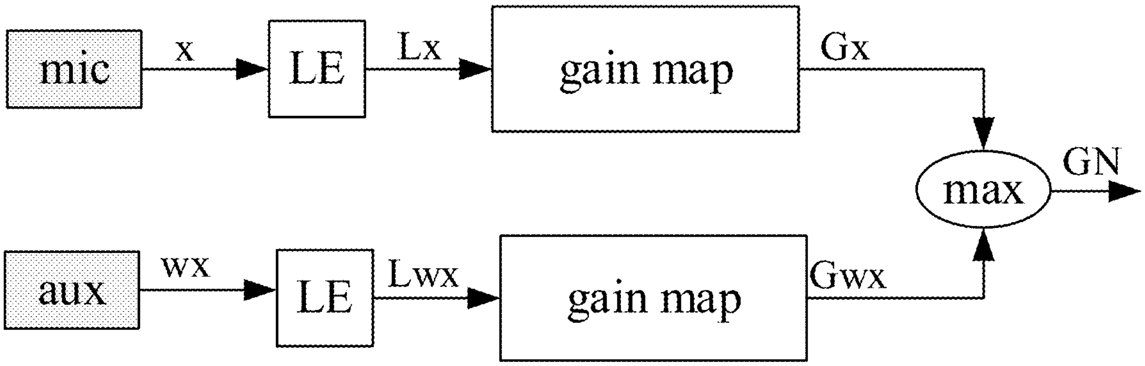

Regarding (wired or wirelessly received) streamed audio input signals (auxiliary audio input) cf. input 'aux' in FIG. 8A, 8B, 8C described below:

FIG. 8A, 8B, 8C shows a first, second and third scenarios of an input stage of a hearing aid comprising a notification unit wherein the input audio signals comprise a mixture of a wirelessly received (streamed) audio signal and an acoustically propagated signal picked up by a microphone.

In case of streamed input signals (cf. signal wx from auxiliary input (aux) in FIG. 8A, 8B, 8C) that are added to the microphone signal(s) (cf. signal x from microphone input (mic) in FIG. 8A, 8B, 8C), $S_{amp}$ may be a combination of the processed microphone signal(s) and the streamed input signal (e.g. represented by the sound pressure level (SPL, [dB]) presented at the eardrum of the user). In case the hearing aid only comprises one (e.g. frequency dependent) level estimator (LE), level estimation may e.g. be performed after combining (or selecting between) the two audio contributions (streamed signal (wx) and microphone signal (x, or beamformed signal)). FIG. 8A shows an embodiment of such a method, based on a level estimate (LE) of the combined signal(s) (y), e.g., a combination (e.g. a sum (or a weighted sum), cf. summation unit ('+') of a microphone (mic) and an auxiliary (aux) signal, and using the estimated level (Ly) in a gain map (gain map, i.e. a level-to-gain estimator, e.g. a lookup-table or an algorithm or a filter) as, e.g., shown in FIG. 3. In FIG. 8A, 8B, 8C, a notification unit (NOTU) according to the present disclosure may be represented by the gain map ('gain map' in FIG. 8A, 8B, 8C, possibly including the level estimator(s)). In FIG. 8A, the gain map ('gain map') receives the level estimate (Ly) from the level estimator (LE) and provides resulting level dependent gain (GN) of the notification signal. The notification unit may further comprise a gain map for the ambient (competing) signal, see e.g. 'gain map (Signal)' in FIG. 9 (and FIG. 4). FIG. 8B shows an embodiment of a method as in FIG. 8A, but with two separate level estimators (LE), one for each input signal (x, wx). The level estimators (LE) provide respective level estimates (Lx, Lwx) of the microphone signal (x) and the streamed signal (wx). The level input (Ly') for the gain map may be chosen as the maximum (or other appropriate function) level of the two-level estimates (Lx, Lwx, cf. 'max' unit in FIG. 8B). FIG. 8C shows an embodiment of a method as in FIG. 8B, but with two separate level estimators (LE) and two separate gain maps ('gain map'), leading to two gain outputs (Gx and Gwx), of which the maximum ('max', or other appropriate function) may be taken as the final gain (GN) applied to the (e.g. spoken) notification.

Figure 6:
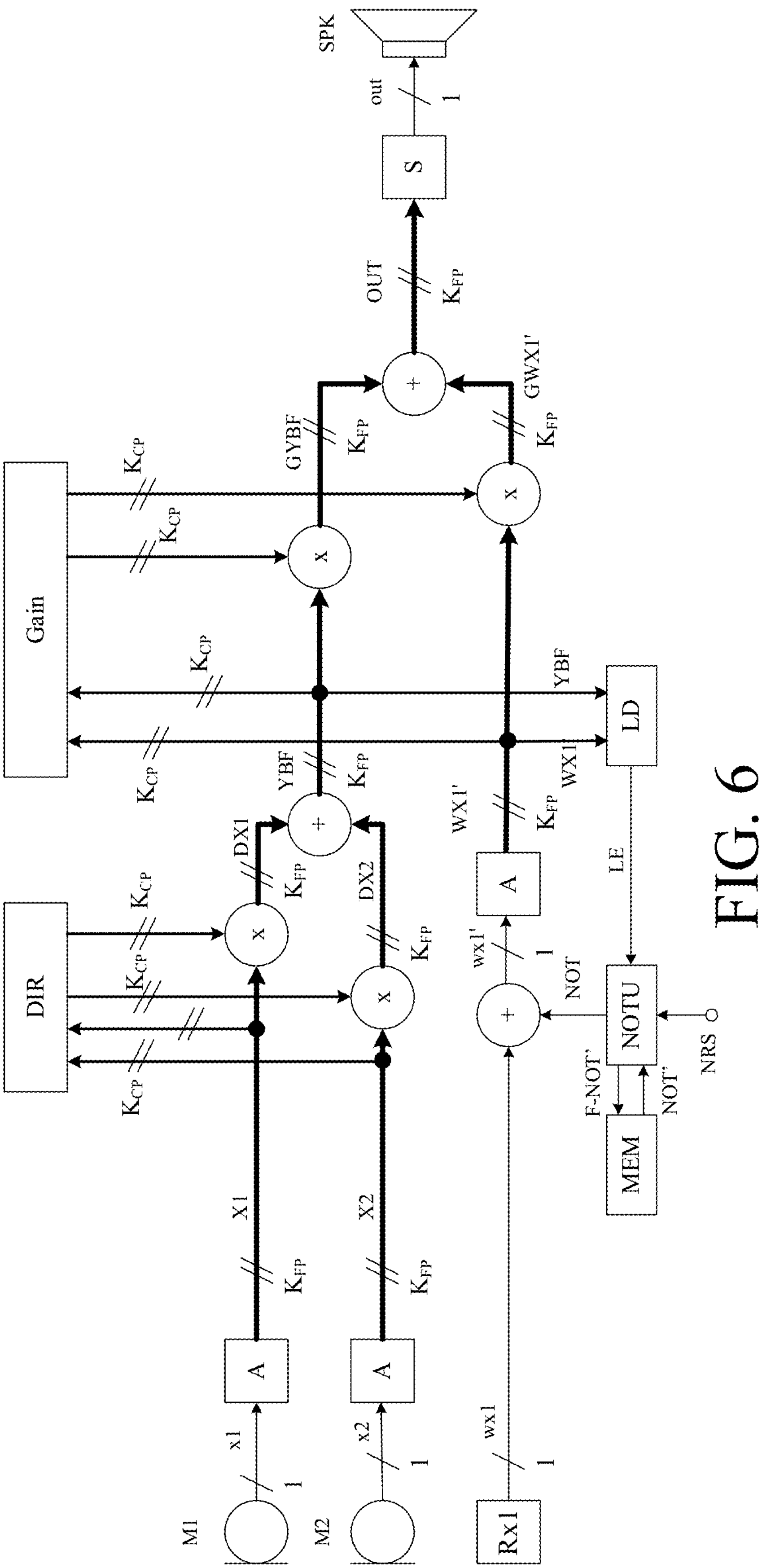
FIG. 6 shows a block diagram of an embodiment of hearing aid comprising a notification unit according to the present disclosure.

FIG. 6 shows a block diagram of an embodiment of hearing aid comprising a notification unit according to the present disclosure. FIG. 6 further shows an example of how a notification unit (NOTU) according to the present disclosure may be embedded in a hearing aid system. The notification unit receives a notification request signal (NRS), e.g. from a processor of the hearing aid. (e.g. related to a battery status). The notification request signal contains a request for a notification to convey a specific message to the user. In response to having received the notification request signal (NRS), the notification unit (NOTU) initiates the generation of the corresponding notification signal (NOT). The different (predefined) notifications (or sub-elements thereof) are stored in memory (MEM), e.g. in an encoded (possibly compressed) version, from which they are retrieved by the notification unit (cf. signal F-NOT'). The relevant notification signal is loaded into the notification unit (NOTU) in an encoded form (NOT'). The encoded notification signal (NOT') is processed in the notification unit (including decoding, cf. e.g. 'A-DEC' in FIG. 7). The estimated level(s) (LE) of the competing signal(s) (here signals WX1' (here incl. notification signal NOT (in the time-frequency domain), when present) and beamformed signal YBF, or their combined level) is/are provided by level detector (or estimator) (LD) (exemplifying a sound scene analyzer according to the present disclosure, cf. e.g. SA in FIG. 1A-D, F)) providing a combined level estimate LE, which is fed to the notification unit (NOTU). During the duration of a notification (NOT), the level estimate (LE) may be fixed to its last value before onset of the notification (NOT) to avoid that the level of the notification (NOT) affects a potential level steering within the notification unit (NOTU). In the embodiment of FIG. 6, the processed notification signal (NOT) provided by the notification unit (NOTU) is added to the input from the auxiliary source (if any), e.g., a streamed signal (wx1) received by a receiver (Rx1), e.g. via Bluetooth, e.g. a signal from a far-end talker of a telephone call. The combined (time-domain) signal (wx1'=wx1+NOT) is subsequently processed by an analysis filter bank (A) providing the combined signal WX1' in a time-frequency representation (comprising $K_{FP}$ frequency sub-band signals). In the embodiment of FIG. 6, the notification unit (NOTU) receives information (cf. signal LE) about the level of a processed microphone signal, here beamformed signal (YBF), and the level of the combined auxiliary and notification signal (WX1) from the level detector (LD) (or a combination of the two). The hearing aid comprises two microphones (M1, M2) picking up sound from the environment of the hearing aid, each providing respective (preferably digitized) input audio signals (x1, x2) in the time domain. The processed microphone signal (YBF) may be a weighted combination of the 2 microphone signals (x1 and x2), each being processed by an analysis filter bank (A) providing the input audio signals (X1, X2) in a time-frequency representation (comprising $K_{FP}$ frequency sub-band signals). A directivity unit (DIR) adds (applies) beamformer and possibly postfilter weights to the band-processed signals X1 and X2. The weights are applied to the band-processed signals X1 and X2 by combination units ('x', e.g. multiplication units) providing respective weighted signals (DX1, DX2) that are combined in combination unit ('+', e.g. a summation unit) to provide the directivity processed (beamformed) signal (YBF). A subsequent gain unit (Gain) applies additional (level- and) frequency-dependent gains to the directivity processed signal (YBF) (e.g. to compensate for the user's hearing impairment) and to the combined signal (WX1') comprising a direct audio input (and occasionally a notification signal), yielding optimized speech processing depending on hearing loss. The resulting signals GYBF and GWX1' are added in the frequency domain (by sum unit (+)) providing output signal (OUT), which is processed by a synthesis filter bank (S) and played back to a user as an output signal (out) via a loudspeaker (SPK). The directivity unit (DIR) (e.g. comprising a beamformer and a postfilter) and the gain unit (Gain) may operate in a different number of frequency bands $K_{CP}$ (e.g. fewer, e.g. 16) than the forward audio path from audio input to audio output (operating in $K_{FP}$ frequency bands, e.g. 64).

In the embodiment of FIG. 6, the notification signal (NOT) is mixed with the streamed signal (wx1) in the time domain. The two signals may, however, be mixed in the time-frequency domain, if appropriate for the application in question. In other embodiments, the notification signal may be mixed with the environment signal, e.g. a single microphone signal or a beamformed signal. The mixing may, as here, be performed before the gain unit (Gain), but may also be mixed after the gain unit, according to the practical design of the hearing aid. The important thing is that the level (and/or other properties) of the notification signal is(are) controlled with a view to the competing signals' (here environment signals (x1, x2) from the microphones (M1, M2)) and directly streamed signal (wx1, or signals) received by a (e.g. wireless) receiver (here Rx1), e.g. in dependence of their level, or spectral content, etc.

Figure 7:
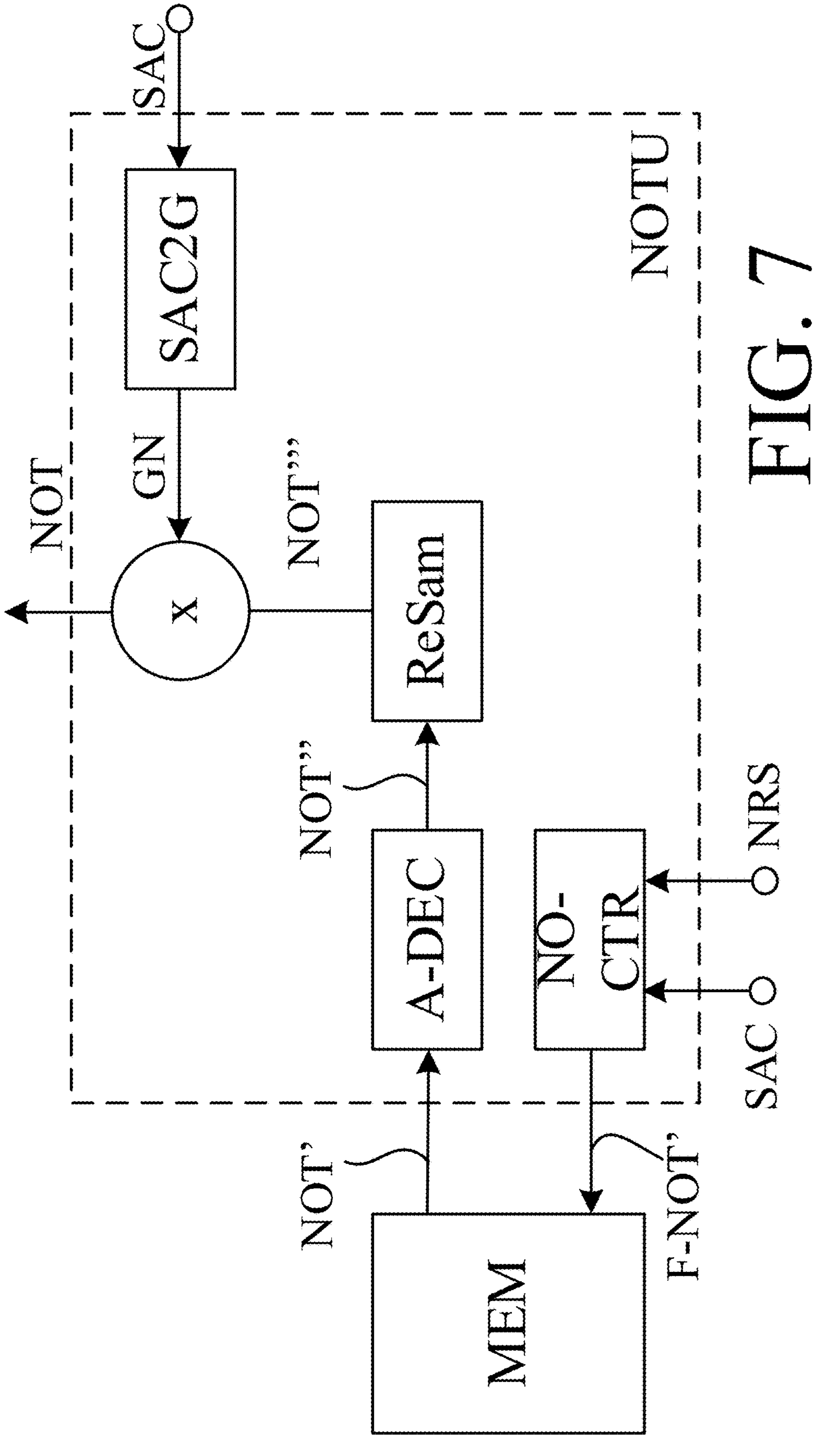
FIG. 7 shows a block diagram of an embodiment of a notification unit according to the present disclosure.

FIG. 7 shows a block diagram of an embodiment of a notification unit (NOTU) according to the present disclosure. FIG. 7 shows a detailed view of an example of the notification unit (NOTU). The encoded signal (NOT') from the memory (MEM) is decoded using a decoder (A-DEC) (e.g. G722), and subsequently resampled with a resampling algorithm (ReSam) to the same sampling frequency used in the signal path (e.g. signal wx1 in FIG. 6). The notification unit comprises a sound scene control signal to gain conversion unit (SAC2G) providing a gain (GN) to be applied to the notification signal in dependence of the sound scene control signal (SAC). A gain (GN) is applied to the decoded and resampled signal (NOT"), e.g. based on the estimated level of the 'background noise' (i.e. the 'competing signals', e.g. including the directivity processed microphone signal YBF and the combined signal WX1' as exemplified in FIG. 6). The applied gain (GN) may also, or alternatively, depend on a sound scene control signal (SAC) based on classification of the acoustic environment in a more general sense, the classification comprising e.g. at least two classes, e.g. 'speech-dominated' or 'non-speech-dominated', and/or including different noise types e.g. modulate noise, unmodulate, e.g. random noise, etc.).

Figure 9:
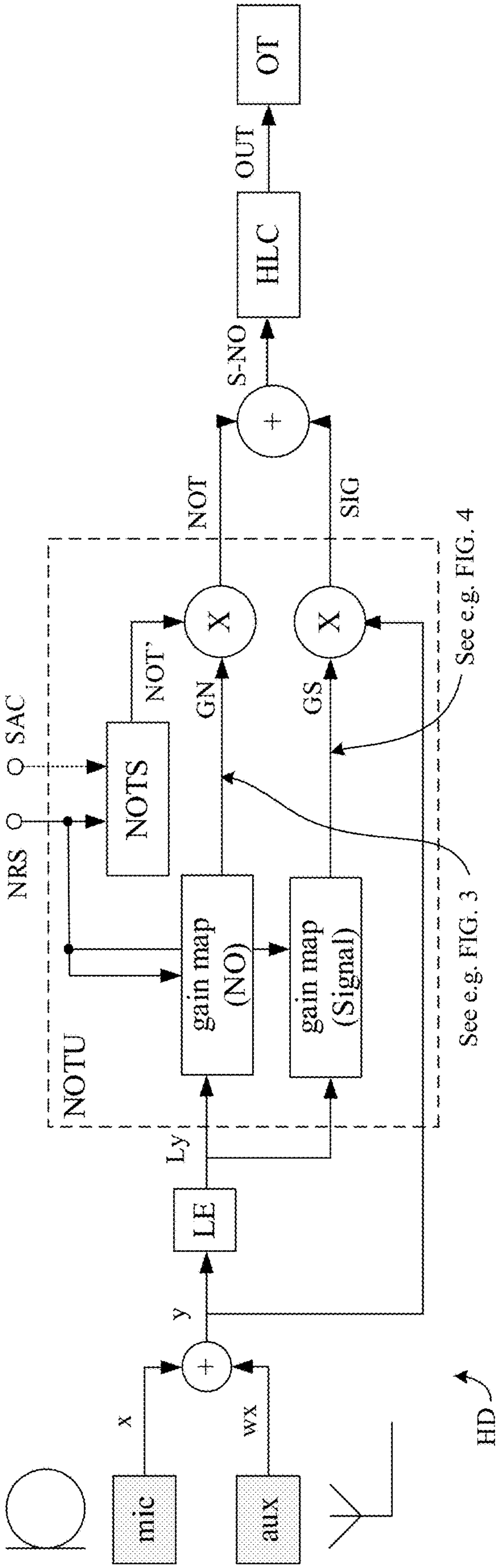
FIG. 9 shows a block diagram of an embodiment of hearing aid comprising a notification unit according to the present disclosure.

FIG. 9 shows a block diagram of an embodiment of hearing aid (HD) comprising a notification unit (NOTU) according to the present disclosure. The input unit of the hearing aid (HD) (similar to FIG. 8A) comprises at least one microphone (mic) for providing at least one input audio signal (x) representative of sound in the environment of the hearing aid. The input unit of the hearing aid (HD) further comprises at least one wireless receiver unit comprising antenna and receiver circuitry (aux) for receiving a streamed signal and providing further (streamed) at least one input audio signal (wx). The (at least two) input audio signals are combined in summation unit ('+') providing a combined input signal (y). The hearing aid (HD) further comprises a level estimator (LE) configured to provide an estimate (Ly) of the level of the current combined input signal (y). The level estimate (Ly) is fed to the notification unit (NOTU). The notification unit (NOTU) receives a notification request signal (NRS, e.g. from a processor of the hearing aid) and optionally a sound scene control signal (cf. dotted arrow denoted 'SAC') indicative of a current sound environment, e.g. from a sound scene analyzer (cf. e.g. unit 'SA' in FIG. 1A, 1B, 1C. 1D, 1F). The notification unit (NOTU) comprises a gain map (level to gain converter, 'gain map (NO)') for translating an input level (Ly) of the competing sounds (y) to a gain (GN) to be applied to the selected notification signal (NOT'), cf. multiplication unit ('X'). The notification signal (NOT') is selected from a notification reservoir (NOTS) based on the notification request signal (NRS). The notification reservoir (NOTS) comprises the predetermined notifications, e.g. spoken notifications or non-spoken, e.g. tonal notifications (e.g. beeps), or combinations thereof. The particular notification signal (NOT') is selected in the notification reservoir (NOTS) (e.g. a memory; cf. FIG. 6, 7) in dependence of the notification request signal (NRS) that is input to the notification reservoir (NOTS) as well as to the notification gain map (gain map (NO)). The selection of the notification signal (NOT') and/or the applied gain (GN) may further be influenced by the sound scene control signal (SAC). The gain map ('gain map (NO)') may e.g. represent the data provided by FIG. 3 to provide an increasing gain (GN) (within a range between a minimum (e.g. 0 dB) and maximum gain (e.g. 10 dB)) with increasing level (Ly) of the competing sounds.

In the embodiment of FIG. 9, the hearing aid, e.g. the notification unit (NOTU), comprises a further gain map ('gain map (Signal)') configured to translate an input level (Ly) of the combined competing sound signal (y) to a gain (GS) to be applied to the combined competing sound signal (y), cf. multiplication unit ('X') and the resulting signal (SIG). The gain map ('gain map (Signal)') may e.g. represent the data provided in FIG. 4 to provide an attenuation (GS) during the duration of the notification signal (NOT), e.g. in dependence of the notification request signal (NRS). The gain map may comprise a constant attenuation when the notification signal is played. The attenuation may be applied when a level of the competing signal (here e.g. Ly) exceeds a threshold. The gain map may comprise a level dependent attenuation of the type indicated in FIG. 3 (but where the vertical axis is attenuation (GS) (instead of amplification (GN)).

In the embodiment of FIG. 9, the notification signal (NOT) is combined with the competing signal (SIG) in combination unit (e.g. a summation unit, '+') providing a combination signal (S-NO) comprising the notification signal and the combined input signal (streamed and microphone signals).

In the embodiment of FIG. 9, the hearing aid, further comprises a hearing loss compensation unit (HLC) for applying a frequency and level dependent gain to the combination signal (S-NO) and to provide a processed output signal (OUT). The hearing loss compensation unit (HLC) is configured to compensate for a hearing impairment of the user of the hearing aid.

The hearing aid further comprises an output transducer (OT) for providing a stimulus perceived by the user as an acoustic signal based on the processed output signal (OUT). The output transducer may e.g. comprise a loudspeaker of an air conduction type of hearing aid) or a vibrator of a bone conducting type of hearing aid, or a multi-electrode array of a cochlear implant type of hearing aid.

Embodiments of the disclosure may e.g. be useful in applications such as hearing aids or headsets.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

U.S. Pat. No. 6,330,339B1 (NEC) Dec. 11, 2001
US2016080876A1 (Oticon) Mar. 17, 2016
EP3930346A1 (Oticon) Dec. 29, 2021

The invention claimed is:

1. A hearing aid configured to be worn by a user, the hearing aid comprising:

An input processing unit comprising at least one input transducer for providing at least one input audio signal representative of sound, the input processing unit providing at least one processed input audio signal in dependence of said at least one input audio signal;

A sound scene analyzer for analyzing said sound in said at least one input audio signal, or in a signal originating therefrom, and providing a sound scene control signal indicative of a current sound environment, wherein the sound scene analyzer is configured to gauge a readiness of the user to receive a notification, and provide the sound scene control signal depending on the readiness of the user;

A notification unit configured to provide a notification signal in response to a notification request signal indicative of a request for conveying a specific message to the user;

An output processing unit for presenting stimuli perceivable as sound to the user, where said stimuli are determined in dependence of said at least one processed input audio signal and said notification signal;

wherein the notification signal is determined in response to said notification request signal and to said sound scene control signal.

2. A hearing aid according to claim 1 wherein the notification request signal is configured to provide a status of functionality of the hearing aid or to provide a confirmation of an action performed by the user to change functionality of the hearing aid.

3. A hearing aid according to claim 2 comprising a notification controller configured to provide said notification request signal when a hearing aid parameter related to said status of functionality of the hearing aid fulfils a hearing aid parameter status criterion.

4. A hearing aid according to claim 3 wherein said status of functionality of the hearing aid comprises a battery status, and wherein said hearing aid parameter related to said status comprises a current battery voltage or an estimated remaining battery capacity, and wherein the battery status criterion comprises that the battery voltage is below a critical voltage threshold value or that the estimated remaining capacity of the battery is below a critical rest capacity threshold value.

5. A hearing aid according to claim 3 wherein said status of functionality of the hearing aid comprises a hearing aid program status, and wherein said hearing aid parameter related to said status comprise a current hearing aid program value, and wherein the hearing aid program status criterion comprises that a hearing aid program has been changed.

6. A hearing aid according to claim 1 wherein the notification signal relates to a) an internal state of the hearing aid, or b) to a confirmation of an action performed by the user to change functionality of the hearing aid.

7. A hearing aid according to claim 1 wherein the sound scene analyzer is configured to determine one or more input audio signal parameters characterizing said current sound environment from said at least one input audio signal, or from a signal originating therefrom.

8. A hearing aid according to claim 1 wherein the sound scene analyzer comprises a sound scene classifier configured to classify the current sound environment represented by the at least one input audio signal, or in a signal originating therefrom, in a number of sound scene classes and to provide a sound scene classification signal indicative of a sound scene class of the current sound environment.

9. A hearing aid according to claim 8 wherein the sound scene classifier is configured to provide at least two sound scene classes, including 'speech-dominated' or 'non-speech-dominated'.

10. A hearing aid according to claim 1 wherein the sound scene analyzer is configured to classify said sound in said at least one input audio signal, or in a signal originating therefrom, according to a level of said signal.

11. A hearing aid according to claim 1 configured to select a type of notification signal in dependence of the sound scene control signal.

12. A hearing aid according to claim 11 wherein the type of notification signal comprises a spoken notification, or a non-spoken notification, or mixture of the two.

13. A hearing aid according to claim 1 wherein the output processing unit is adapted to apply a level and frequency dependent gain to the input audio signal, or to a signal originating therefrom, to compensate for the user's hearing impairment.

14. A hearing aid according to claim 1 wherein the notification unit is configured to provide a notification signal and a notification processing control signal in response to the notification request signal and the sound scene control signal, wherein the notification processing control signal is determined in dependence of said sound scene control signal.

15. A hearing aid according to claim 14 wherein the notification processing control signal is forwarded to the output processing unit.

16. A hearing aid according to claim 14 wherein the notification processing control signal is configured to control a gain applied to a combined signal comprising the input audio signal, or a processed version thereof, and the notification signal in dependence of a type of notification signal.

17. A hearing aid according to claim 16 wherein the notification signal comprises a combination of a non-spoken signal and a subsequent spoken signal, and wherein the notification processing control signal is configured to adapt the gain to the combined signal comprising the non-spoken part of the notification signal to be larger than the gain applied to the combined signal comprising the spoken part of the notification signal, to focus the user's attention to the spoken part of the notification signal.

18. A hearing aid according to claim 14 wherein the notification processing control signal is configured to control processing of the notification signal in the output processing unit so that a gain applied to the notification signal is controlled relative to a level of the processed input audio signal received from the input processing unit.

19. A hearing aid according to claim 14 wherein the notification processing control signal contains instructions to the output processing unit to apply a specific gain to the processed input audio signal, when the notification signal is present.

20. A hearing aid according to claim 1 comprising a user interface configured to allow a user to control functionality of the hearing aid, including to allow the user to configure the notification unit.

21. A hearing aid according to claim 1 comprising a notification mode of operation, wherein said notification unit provides a specific notification signal having a specific duration, and wherein the processed input audio signal to the output processing unit comprises said at least one input audio signal, or a signal or signals originating therefrom, and said specific notification signal.

22. A hearing aid according to claim 1 wherein the at least one input transducer comprises a microphone for converting sound in the environment of the hearing aid to an input audio signal representing the sound, and/or a wireless audio receiver for receiving an audio signal from another device, the wireless audio receiver being configured to provide a streamed input audio signal.

23. A hearing aid according to claim 1 being constituted by or comprising an air-conduction type hearing aid, a bone-conduction type hearing aid, a cochlear implant type hearing aid, or a combination thereof.

24. A method of operating a hearing aid configured to be worn by a user, the method comprising:

providing at least one input audio signal representative of sound, providing at least one processed input audio signal in dependence of said at least one input audio signal;

analyzing said sound in said at least one input audio signal, or in a signal originating therefrom, and providing a sound scene control signal indicative of a current sound environment, wherein analyzing said sound comprises gauging a readiness of the user to receive a notification, and the sound scene control signal is provided dependent on the readiness of the user;

providing a notification signal in response to a notification request signal indicative of a request for conveying a specific message to the user;

presenting stimuli perceivable as sound to the user, where said stimuli are determined in dependence of said at least one processed input audio signal and said notification signal, wherein the notification signal is determined in response to said notification request signal and to said sound scene control signal.

* * * * *